United States Patent
Dharmadhikari et al.

(10) Patent No.: US 12,413,641 B2
(45) Date of Patent: Sep. 9, 2025

(54) METHOD AND SYSTEM FOR PREDICTING CONTENT BASED RECOMMENDATIONS

(71) Applicant: Samsung Electronics Co., Ltd., Suwon-si (KR)

(72) Inventors: Poorva Dharmadhikari, Bangalore (IN); Mayank Gupta, Bangalore (IN); Rajat Kumar, Bangalore (IN); Siba Prasad Samal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 17/295,395

(22) PCT Filed: Nov. 18, 2019

(86) PCT No.: PCT/KR2019/015778
§ 371 (c)(1),
(2) Date: May 19, 2021

(87) PCT Pub. No.: WO2020/105992
PCT Pub. Date: May 28, 2020

(65) Prior Publication Data
US 2021/0397664 A1    Dec. 23, 2021

(30) Foreign Application Priority Data

Nov. 19, 2018  (IN) .............................. 201841043507
Nov. 5, 2019   (IN) .............................. 201841043507

(51) Int. Cl.
*G06F 15/173*    (2006.01)
*G06F 16/9535*   (2019.01)
(Continued)

(52) U.S. Cl.
CPC .......... *H04L 67/12* (2013.01); *G06F 16/9535* (2019.01); *G16Y 40/20* (2020.01);
(Continued)

(58) Field of Classification Search
None
See application file for complete search history.

(56) References Cited

U.S. PATENT DOCUMENTS 10,516,186 B2    12/2019  Park et al.
10,609,183 B2 *   3/2020  Thomée ................ H04L 51/214
(Continued)

FOREIGN PATENT DOCUMENTS

CN    105656960 A    6/2016
CN    105900142 A    8/2016
(Continued)

OTHER PUBLICATIONS

Supplementary European Search Report dated Sep. 7, 2021, from the European Patent Office, in connection with counterpart European Patent Application No. 19886933.1, 8 pages.
(Continued)

*Primary Examiner* — Yves Dalencourt

(57) ABSTRACT

The embodiments herein provide a method for predicting content based recommendations. The method includes recognizing, by a first electronic device (100A) in a first IoT network (100), content displayed on a display (130A) of the first electronic device (100A). Further, the method includes predicting, by the first electronic device (100A), at least one recommendation corresponding to the content based on a history of user activities performed by a user using at least one of the first electronic device (100A) and other electronic devices (100B-100F) in the first IoT network (100). Further, the method includes providing, by the first electronic device (100A), the at least one recommendation on an action prediction panel of a keyboard of the first electronic device (100A).

9 Claims, 18 Drawing Sheets

(51) Int. Cl.
*G16Y 40/20* (2020.01)
*H04L 51/046* (2022.01)
*H04L 67/02* (2022.01)
*H04L 67/12* (2022.01)
*H04L 67/50* (2022.01)

(52) U.S. Cl.
CPC ............ *H04L 51/046* (2013.01); *H04L 67/02* (2013.01); *H04L 67/535* (2022.05)

(56) References Cited

U.S. PATENT DOCUMENTS

| | | |
|---|---|---|
| 2014/0244568 A1 | 8/2014 | Goel et al. |
| 2015/0019342 A1 | 1/2015 | Gupta |
| 2015/0019553 A1 | 1/2015 | Shaashua et al. |
| 2015/0185713 A1 | 7/2015 | Glickfield et al. |
| 2015/0347114 A1 | 12/2015 | Yoon |
| 2016/0080810 A1 | 3/2016 | Dutta et al. |
| 2016/0132563 A1 | 5/2016 | Bhandari et al. |
| 2016/0191453 A1* | 6/2016 | Thomas .................. H04L 51/52 709/206 |
| 2016/0323213 A1* | 11/2016 | Hong .................... H04L 51/066 |
| 2016/0337422 A1* | 11/2016 | Lai ........................ H04W 76/40 |
| 2016/0357406 A1* | 12/2016 | Lee ........................ G06V 10/17 |
| 2017/0048184 A1* | 2/2017 | Lewis ..................... H04L 51/10 |
| 2017/0053032 A1 | 2/2017 | Liongosari et al. |
| 2017/0078225 A1* | 3/2017 | Pandey ................. H04L 51/046 |
| 2017/0105131 A1 | 4/2017 | Song et al. |
| 2017/0109794 A1 | 4/2017 | Smith et al. |
| 2018/0183685 A1 | 6/2018 | Cook |
| 2018/0220476 A1 | 8/2018 | Jung et al. |
| 2018/0285463 A1* | 10/2018 | Choi .................... G06F 16/9535 |
| 2018/0351793 A1* | 12/2018 | Hunter ................ H04L 41/0836 |

FOREIGN PATENT DOCUMENTS

| | | | |
|---|---|---|---|
| CN | 106537849 A | 3/2017 | |
| EP | 3335190 B1 * | 8/2020 | ........... G06Q 10/107 |
| KR | 10-2016-0057303 A | 5/2016 | |
| KR | 101723984 B1 | 4/2017 | |
| KR | 101745311 B1 | 6/2017 | |
| KR | 10-2018-0080986 A | 7/2018 | |
| KR | 10-2018-0086712 A | 8/2018 | |
| KR | 20180103635 A | 9/2018 | |
| KR | 20180105301 A | 9/2018 | |
| TW | 201806360 A | 2/2018 | |
| WO | 2014131015 A2 | 8/2014 | |
| WO | 2014182692 A1 | 11/2014 | |
| WO | 2017218437 A1 | 12/2017 | |

OTHER PUBLICATIONS

International Search Report dated Feb. 25, 2020 in connection with International Patent Application No. PCT/KR2019/015778, 3 pages.
Written Opinion of the International Searching Authority dated Feb. 25, 2020 in connection with International Patent Application No. PCT/KR2019/015778, 6 pages.
Office Action dated Apr. 29, 2021 in connection with India Patent Application No. 201841043507, 7 pages.
Office Action dated Oct. 27, 2023, in connection with Chinese Patent Application No. 201980074981.5, 30 pages.
Dong et al., "IoT centralized support system construction strategy oriented connected," Jul. 3, 2018, 7 pages.
Hearing Notice issued Jul. 4, 2024, in connection with Indian Patent Application No. 201841043507, 2 pages.

* cited by examiner

[Fig. 1]
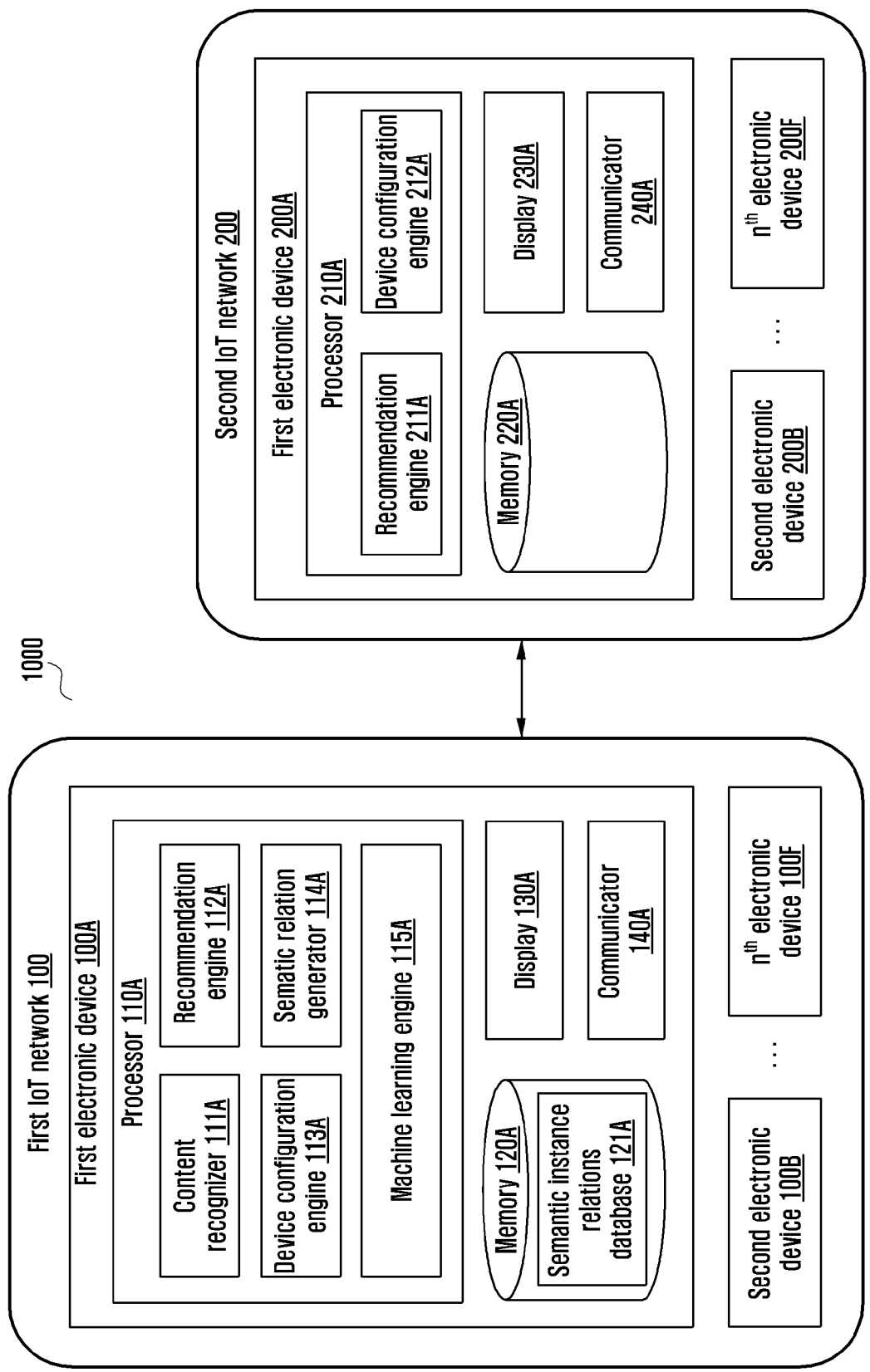

[Fig. 2a]
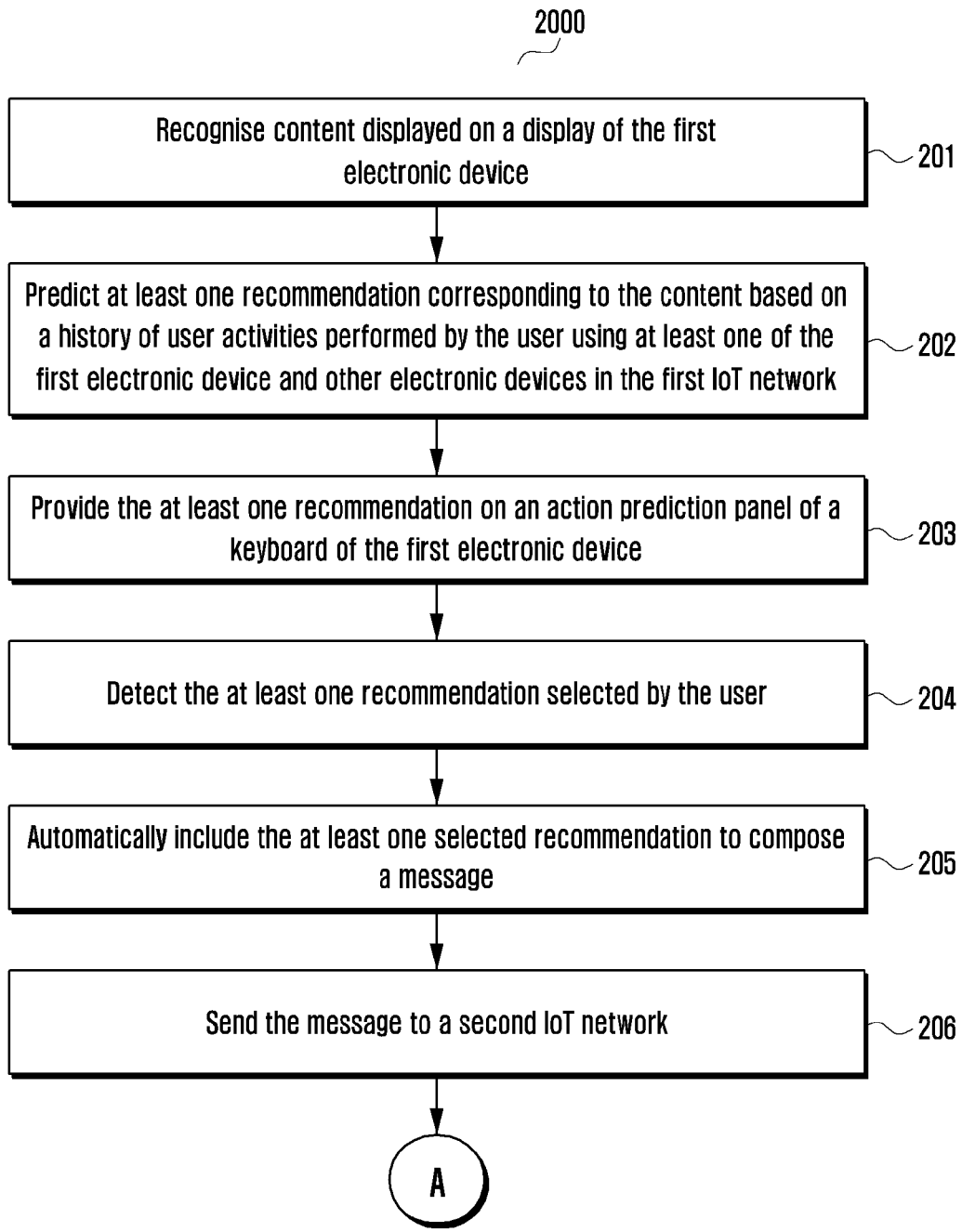

[Fig. 2b]
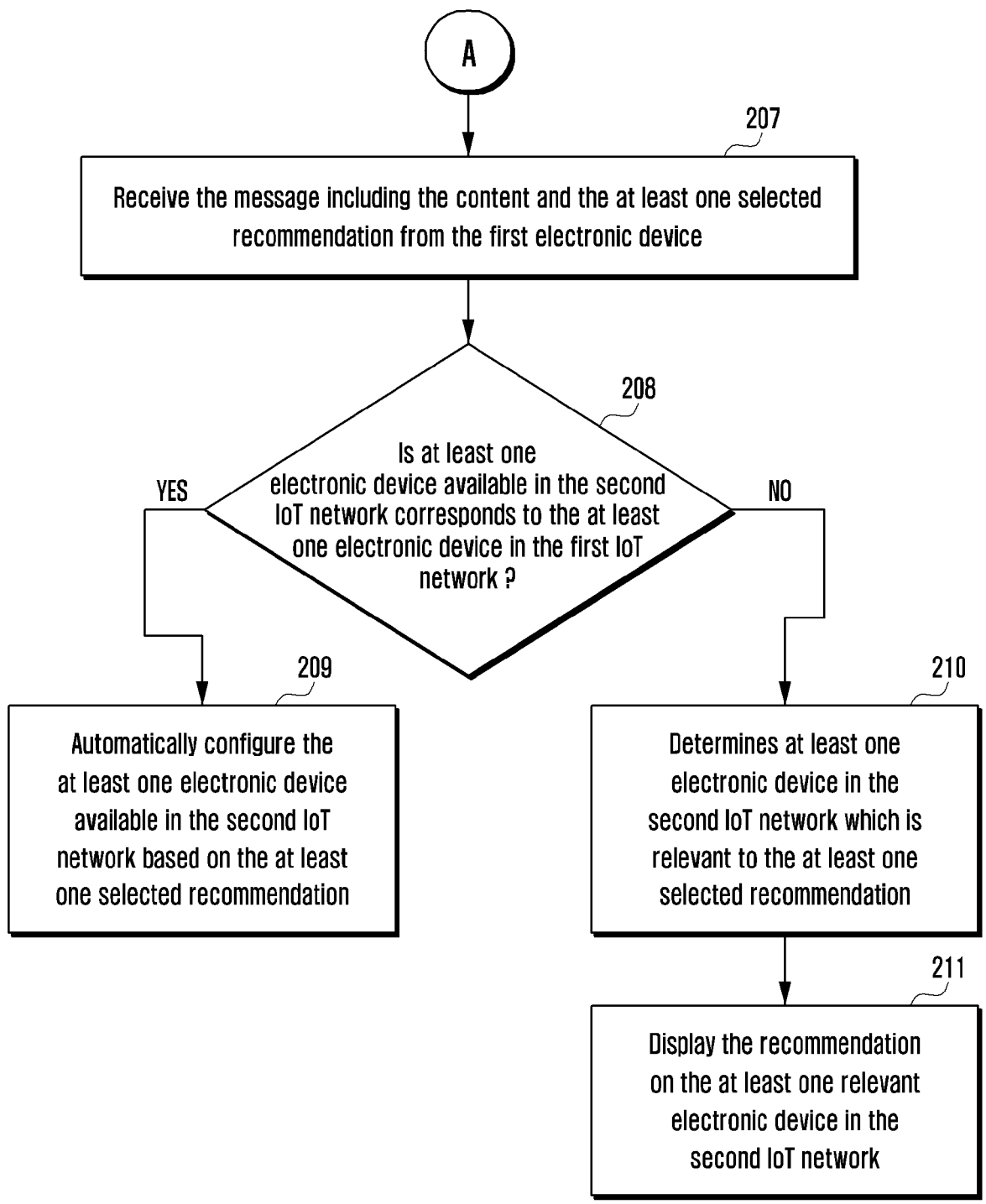

[Fig. 3]
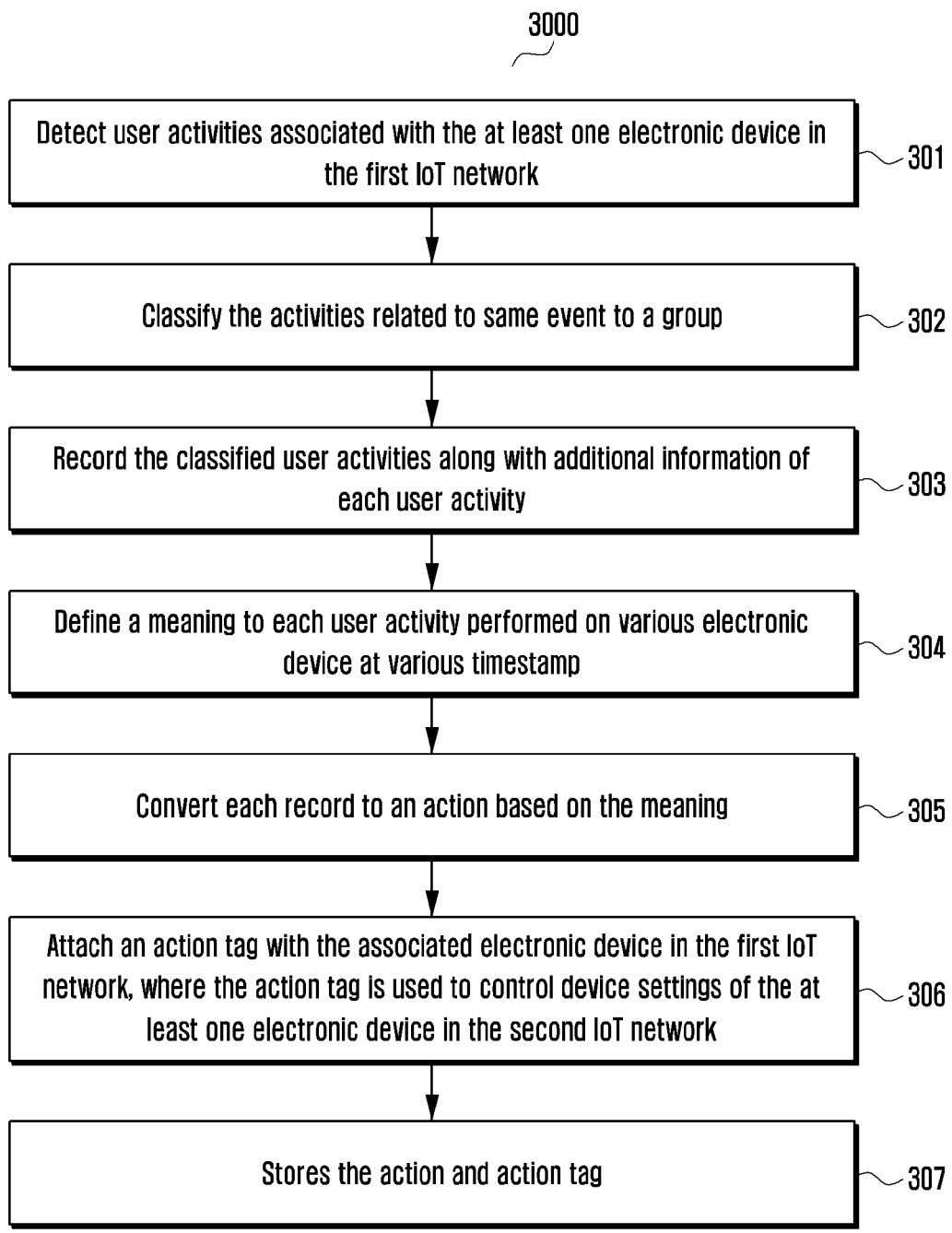

[Fig. 4]
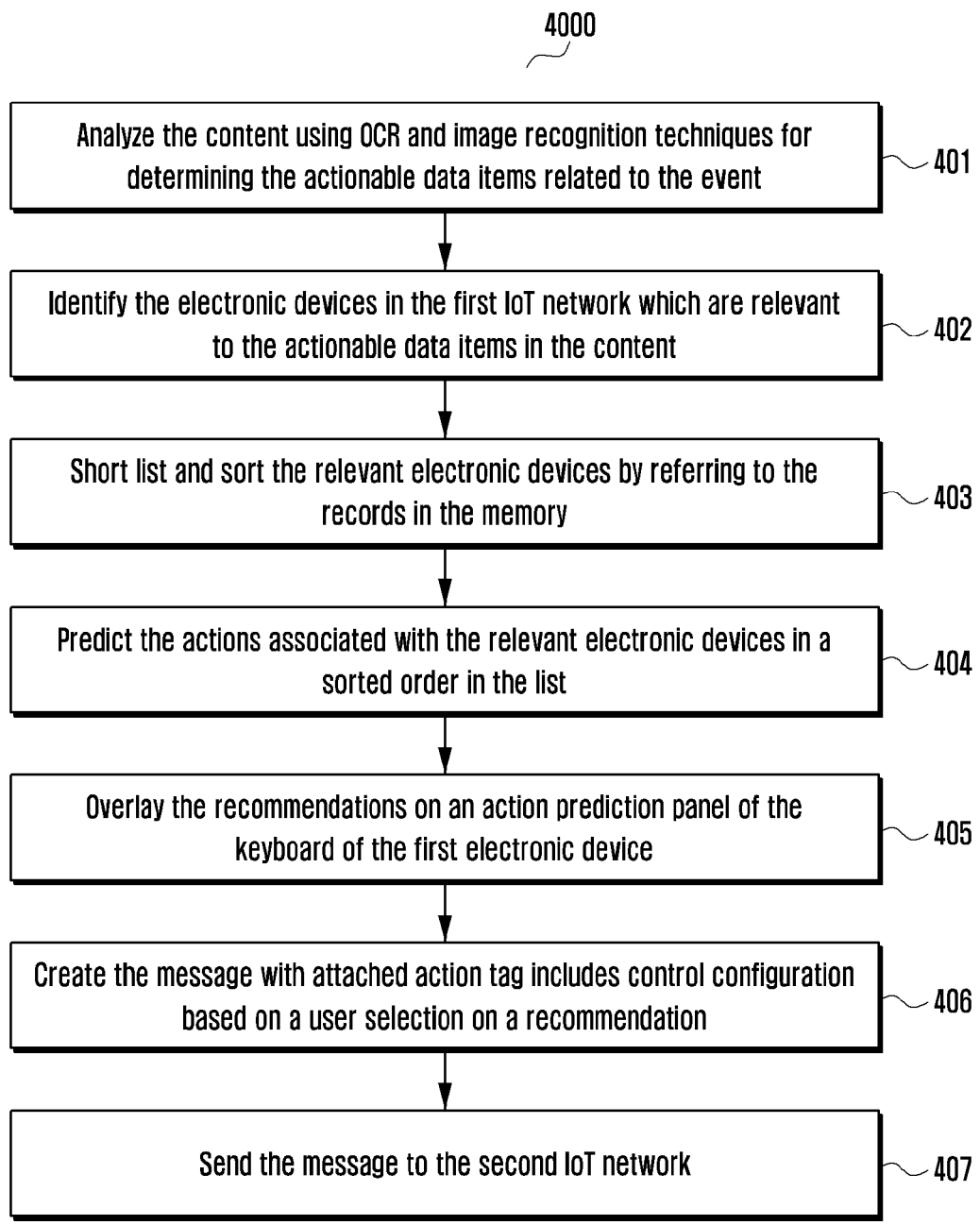

[Fig. 5]
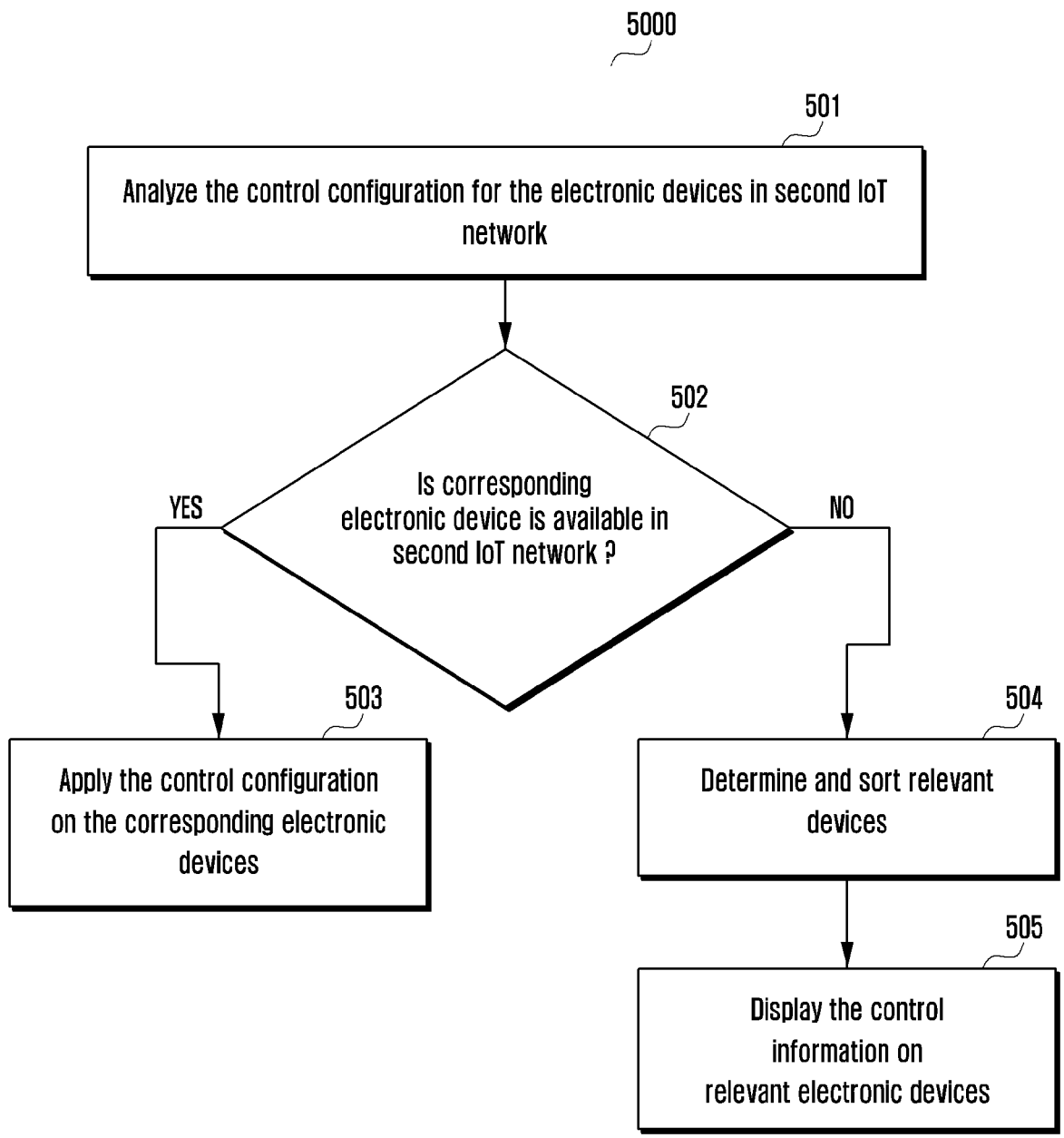

[Fig. 6a]
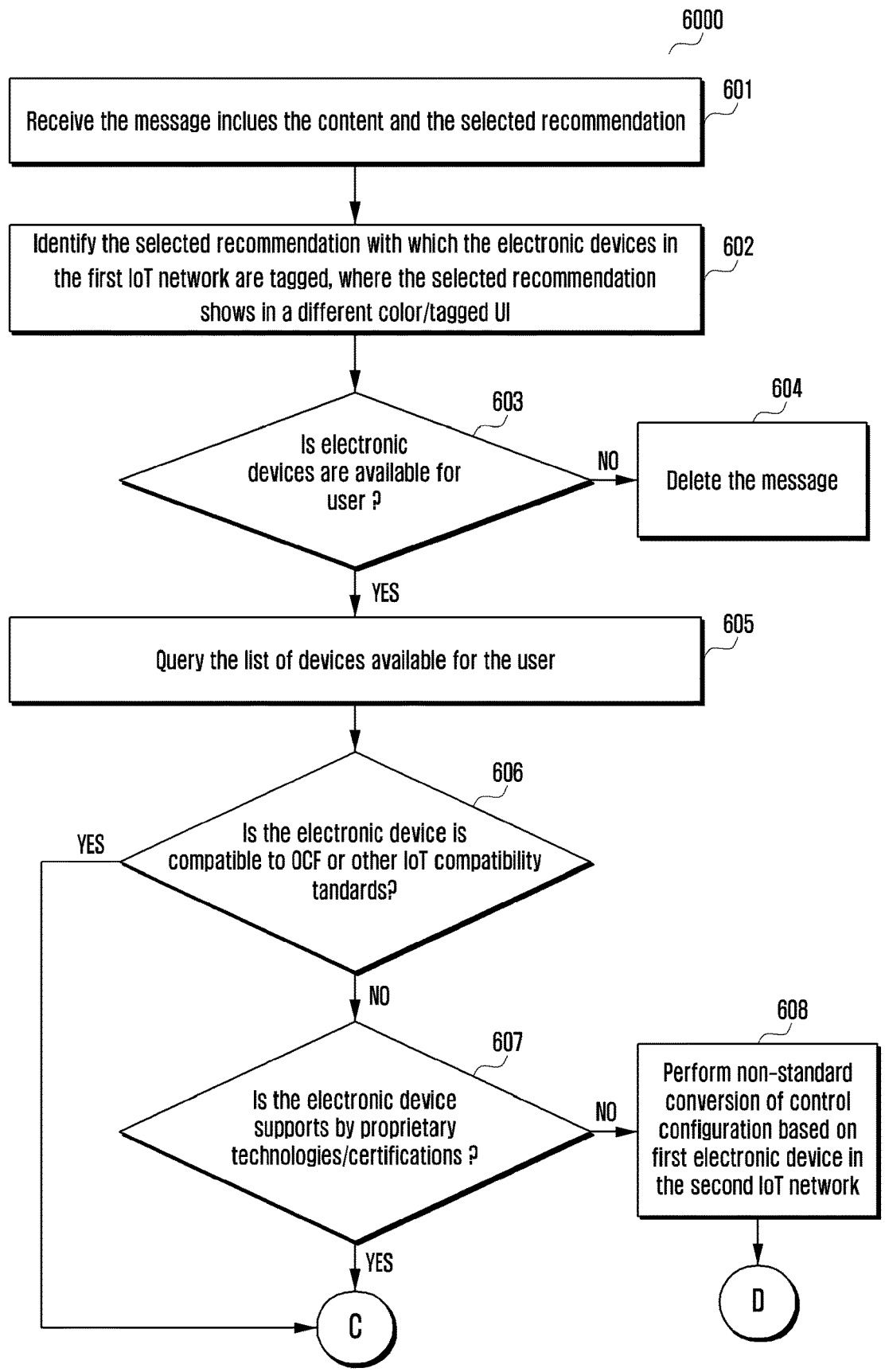

[Fig. 6b]
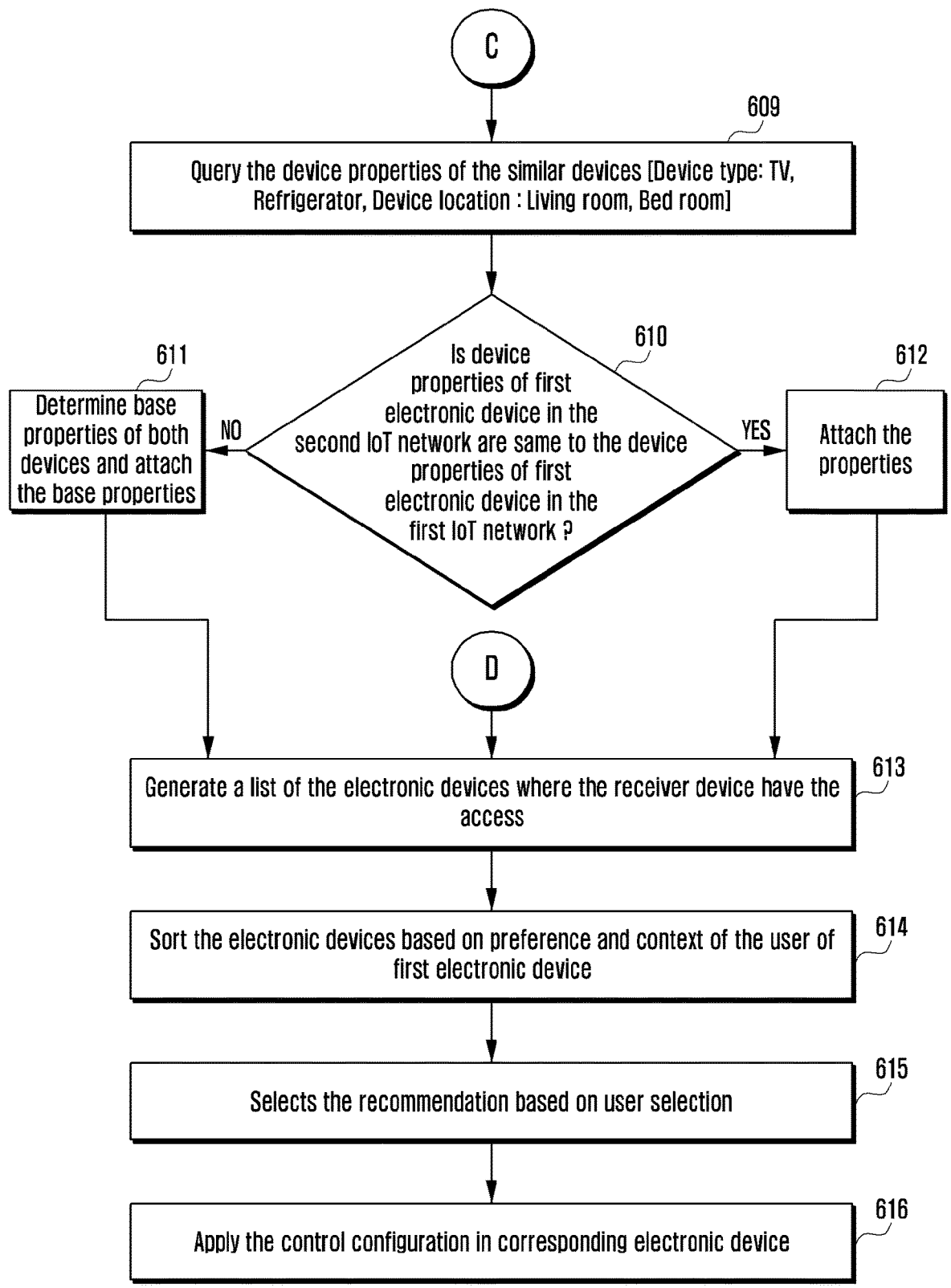

[Fig. 7a]
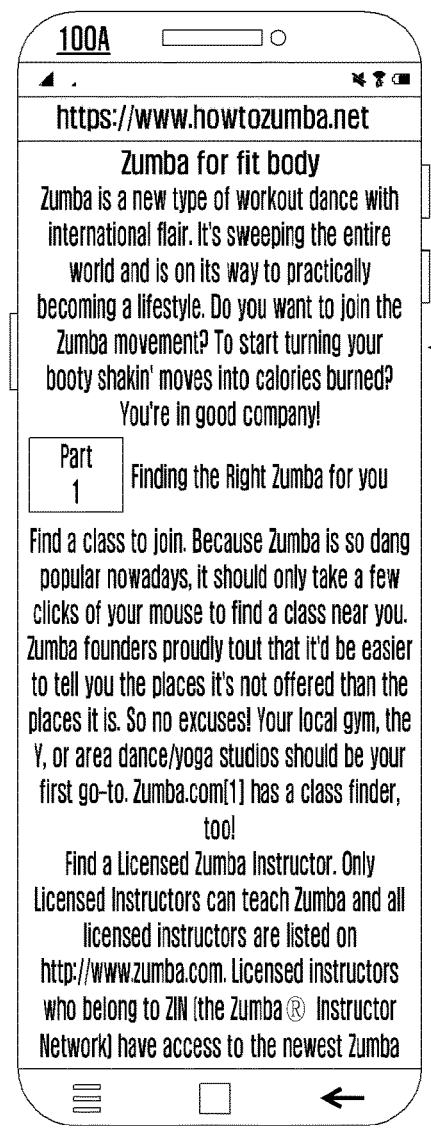
(a)
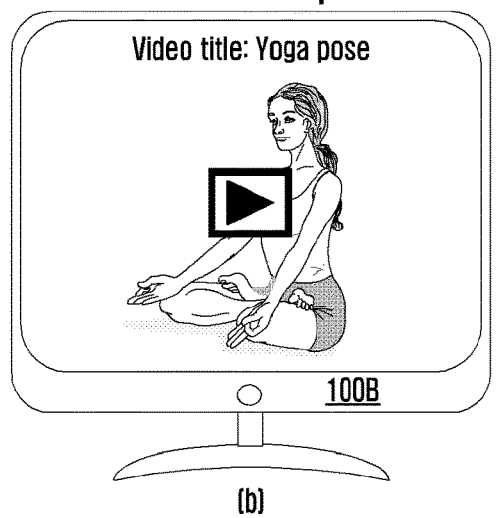
(b)
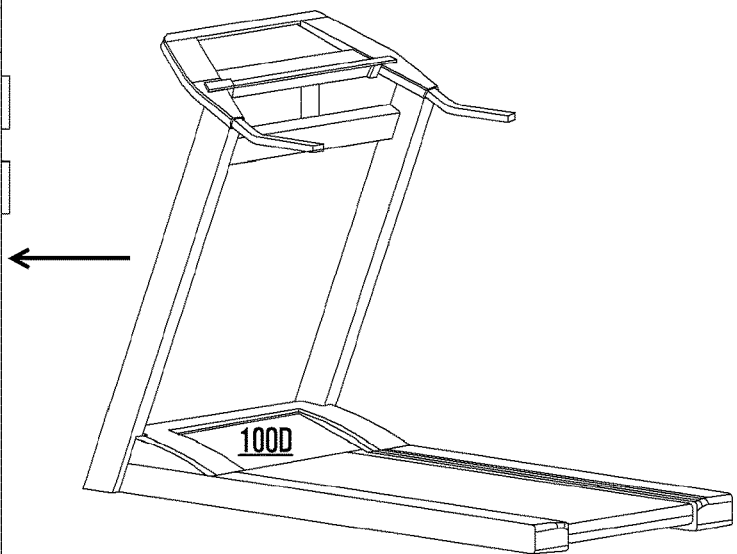
(d)
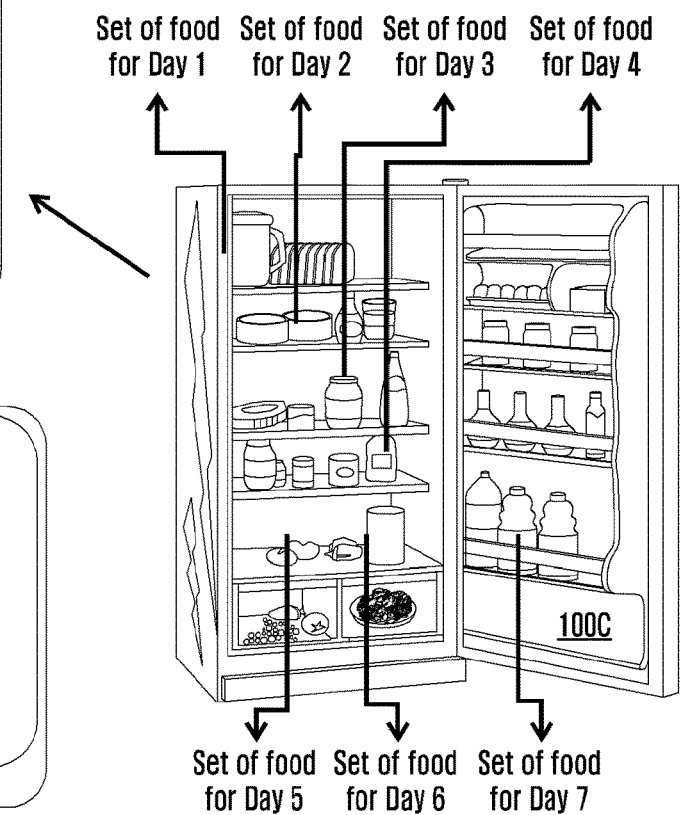
(c)

[Fig. 7b]
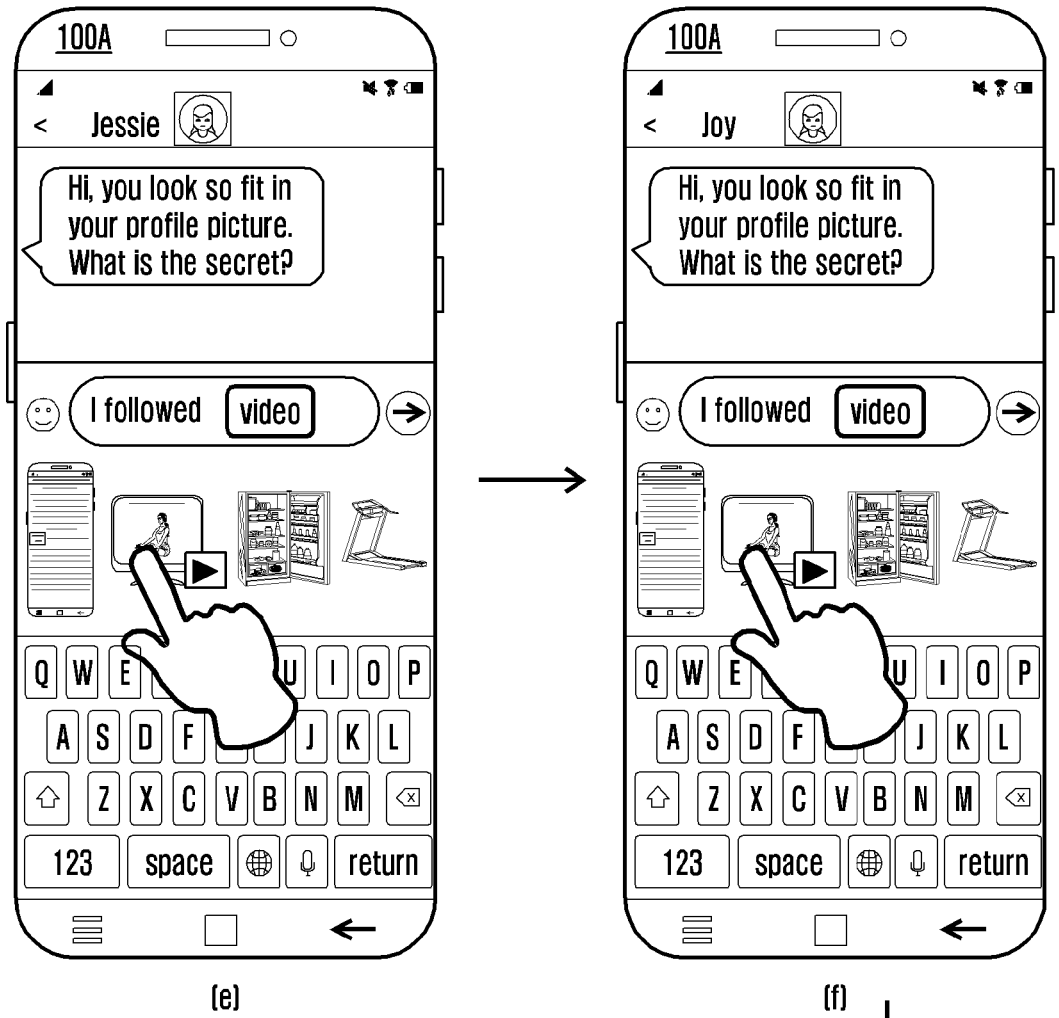

[Fig. 8a]
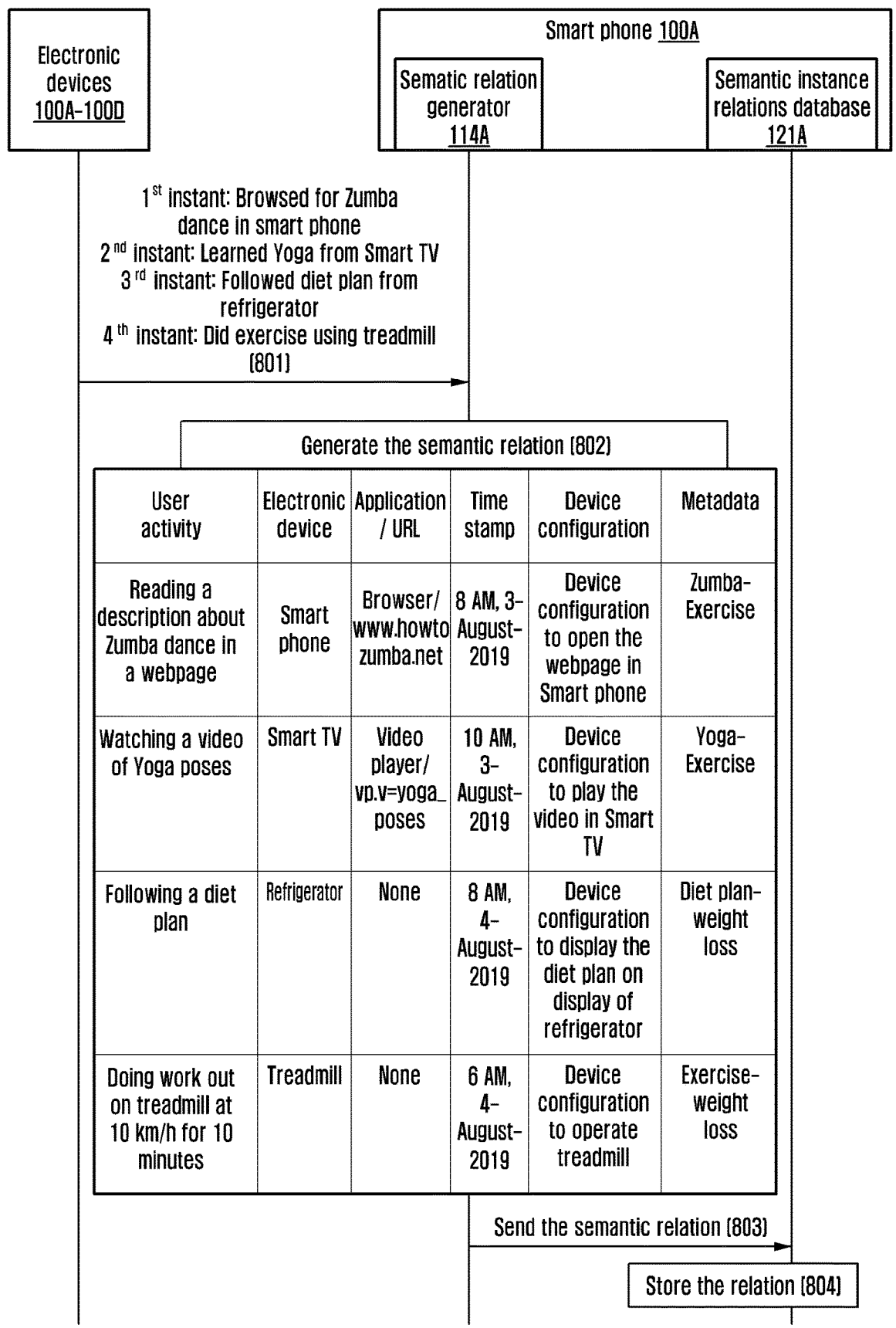

[Fig. 8b]
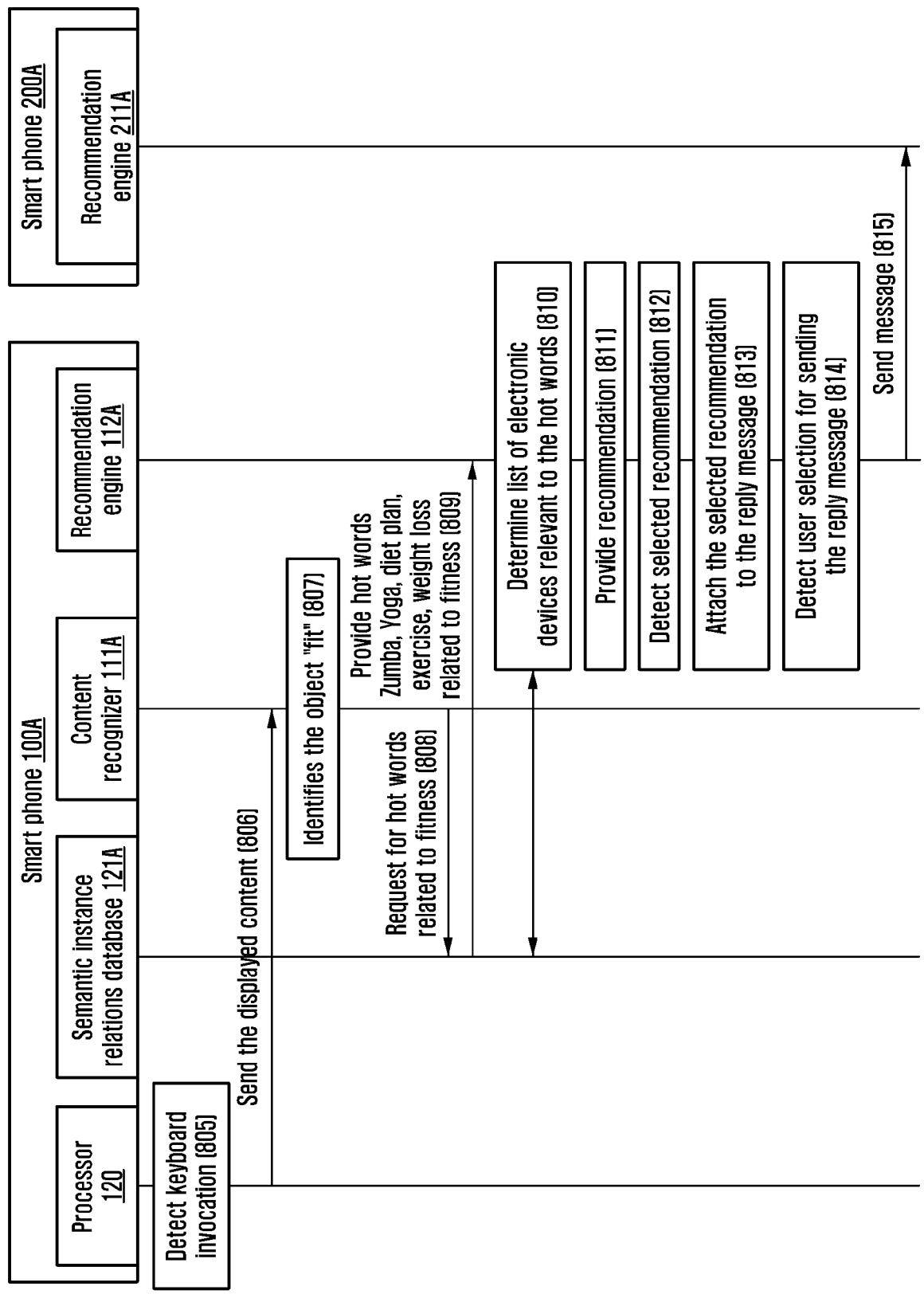

[Fig. 8c]
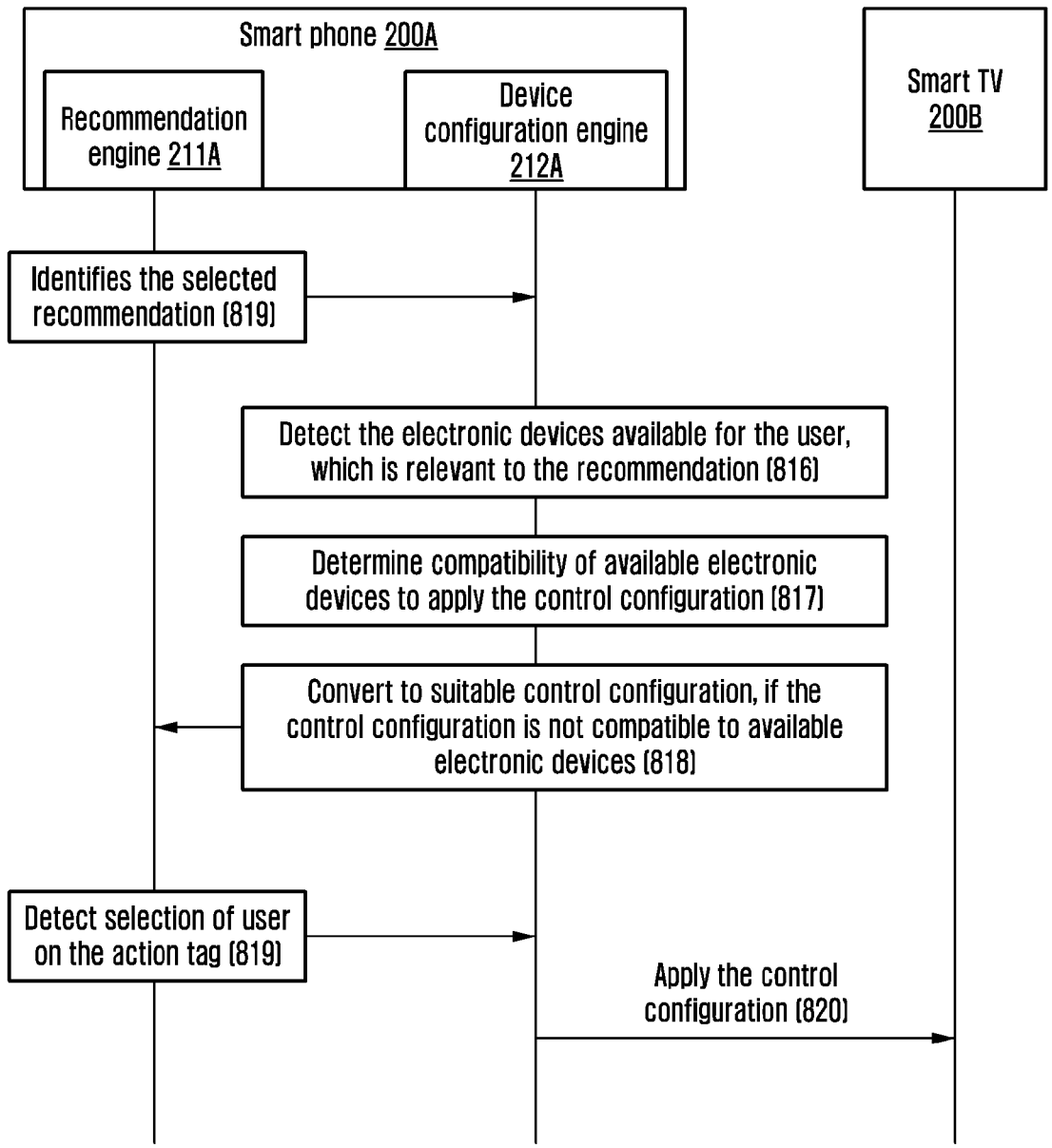

[Fig. 9a]
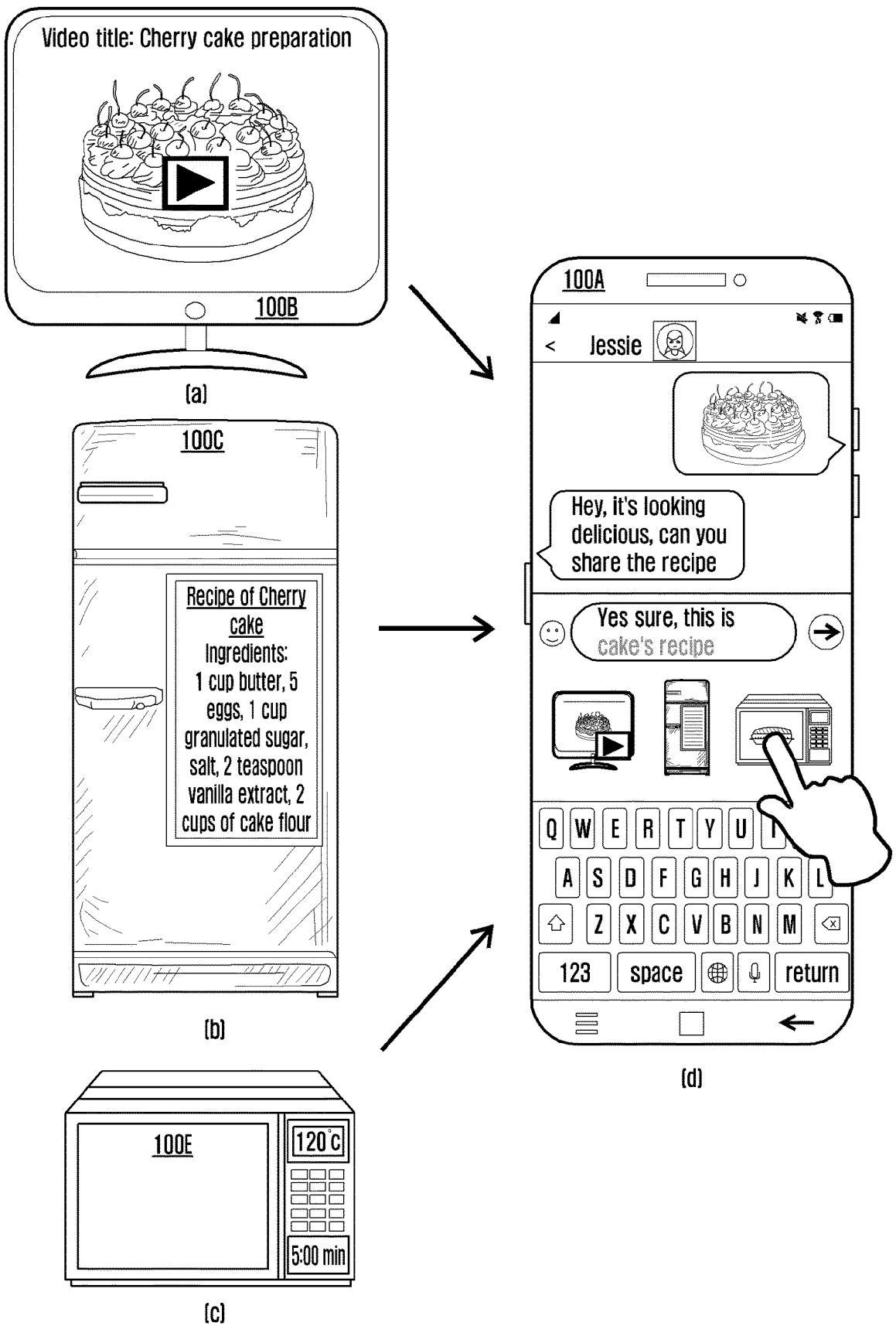

[Fig. 9b]
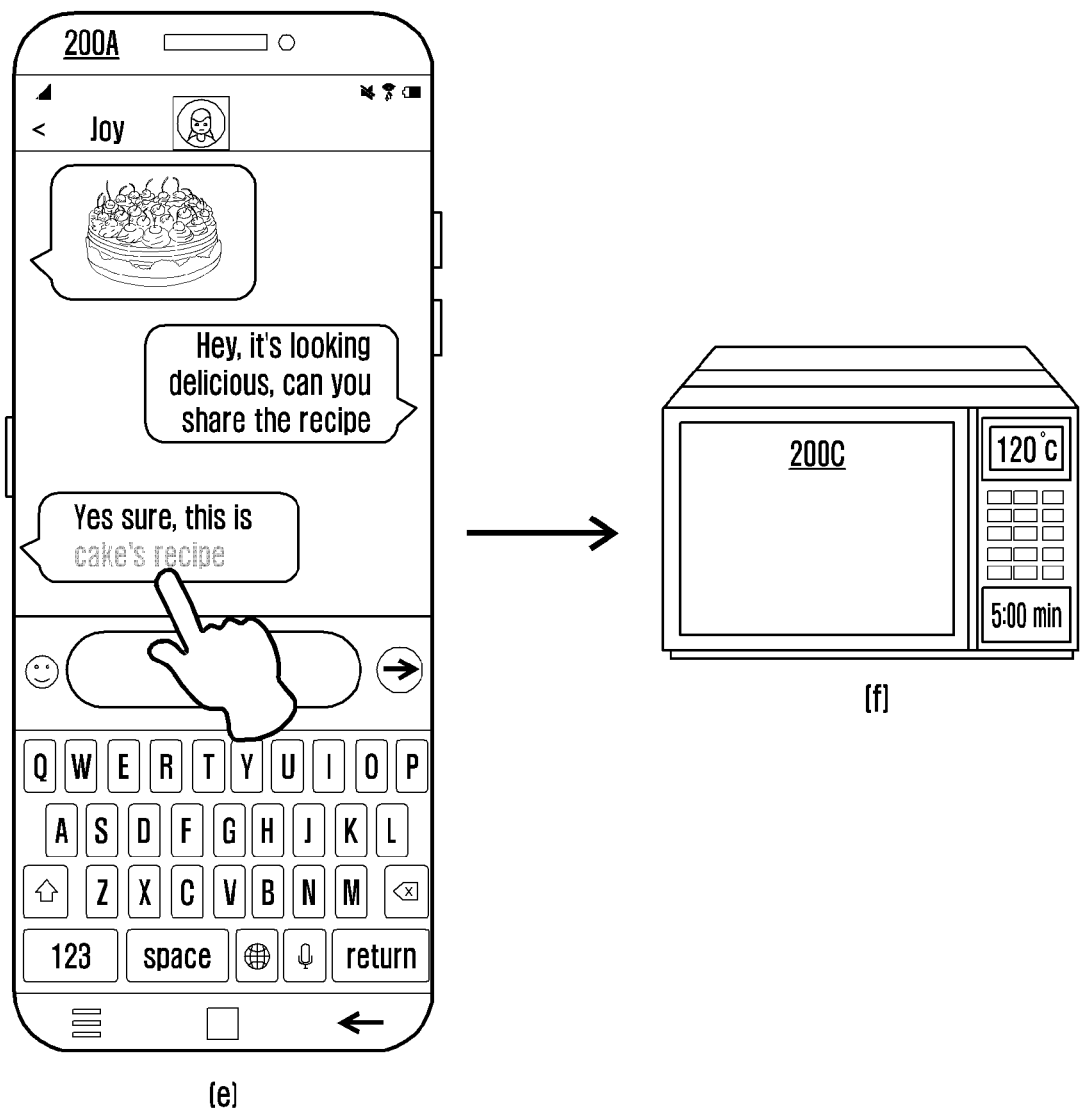

[Fig. 10]
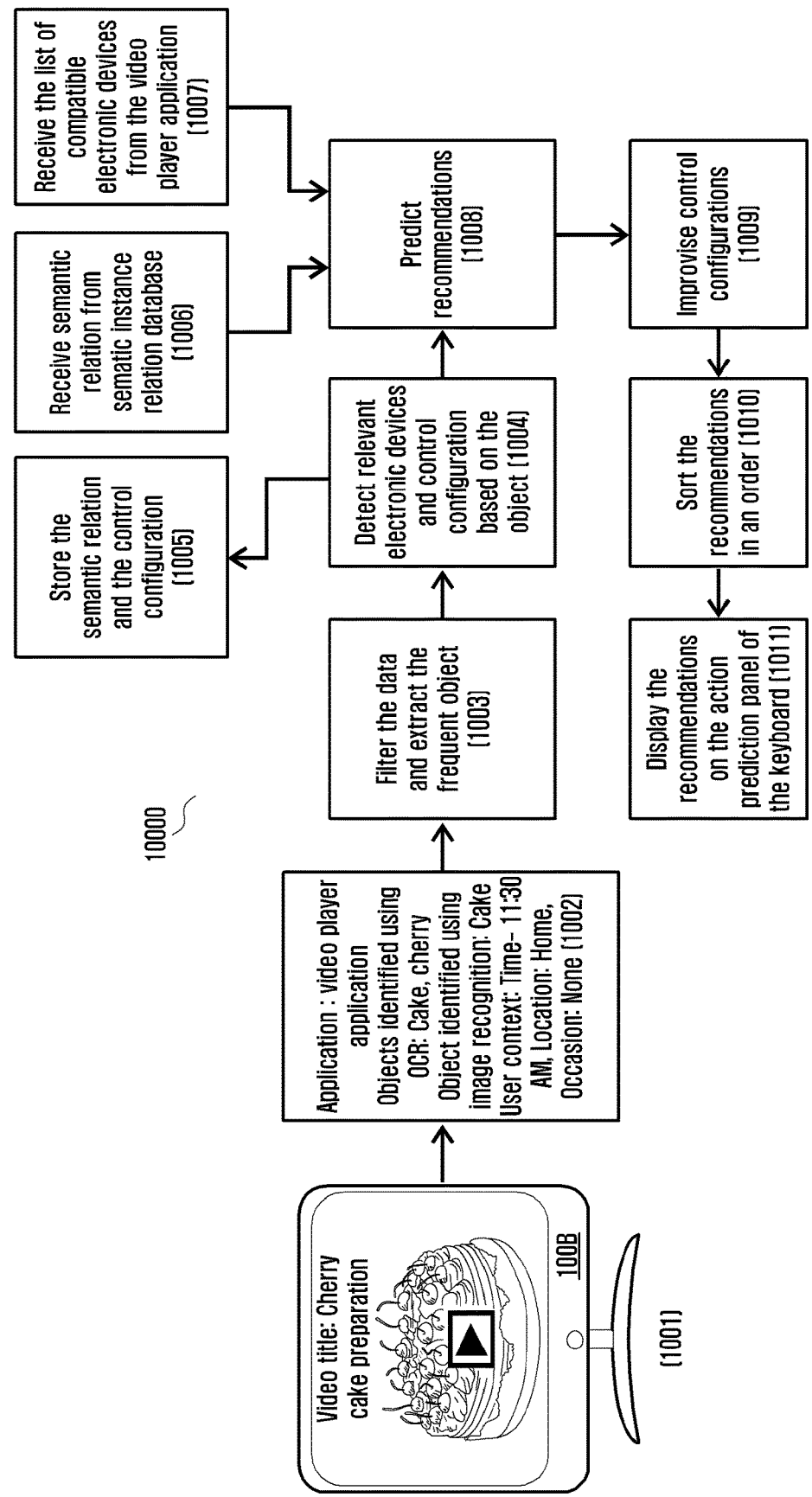

[Fig. 11a]
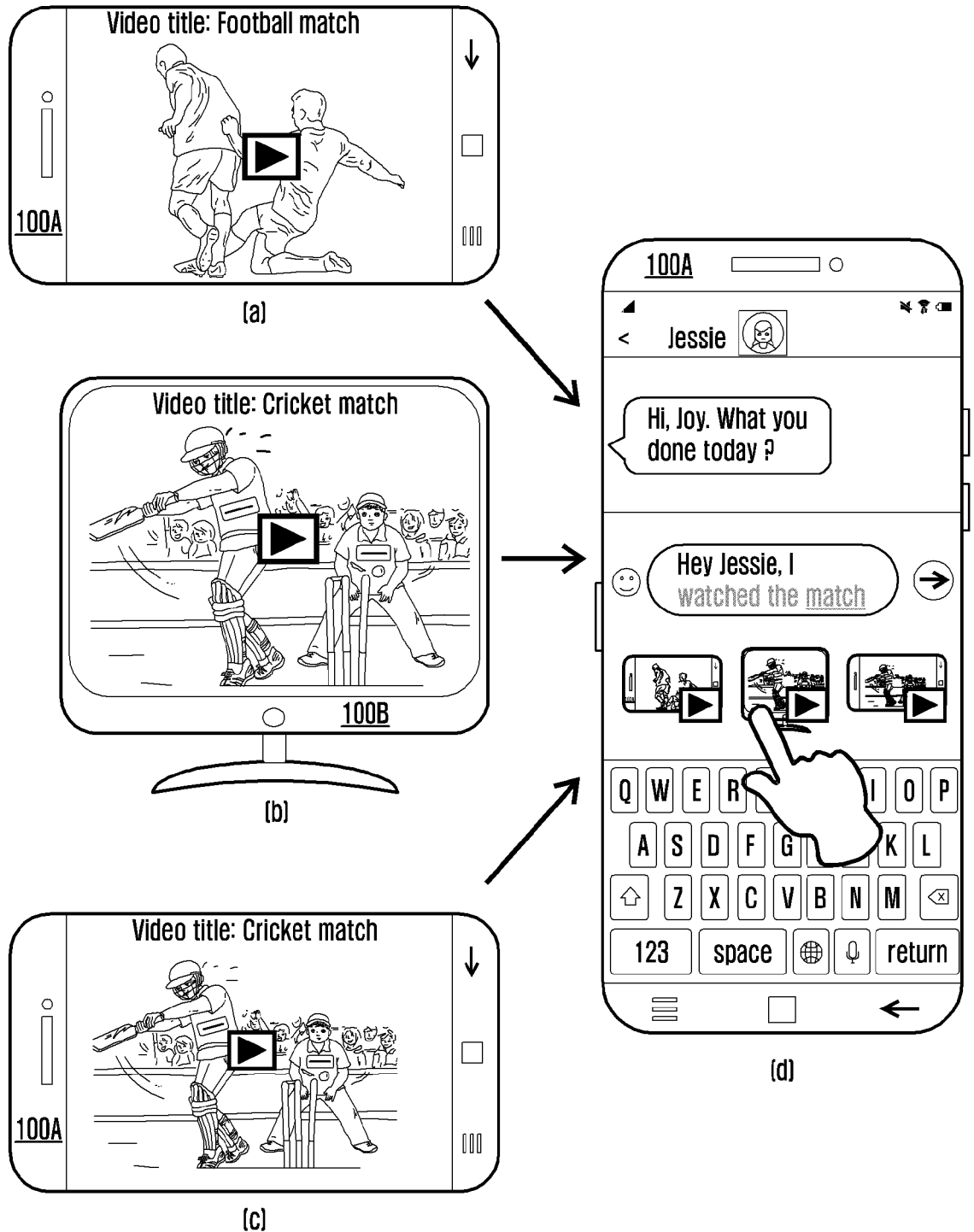

[Fig. 11b]
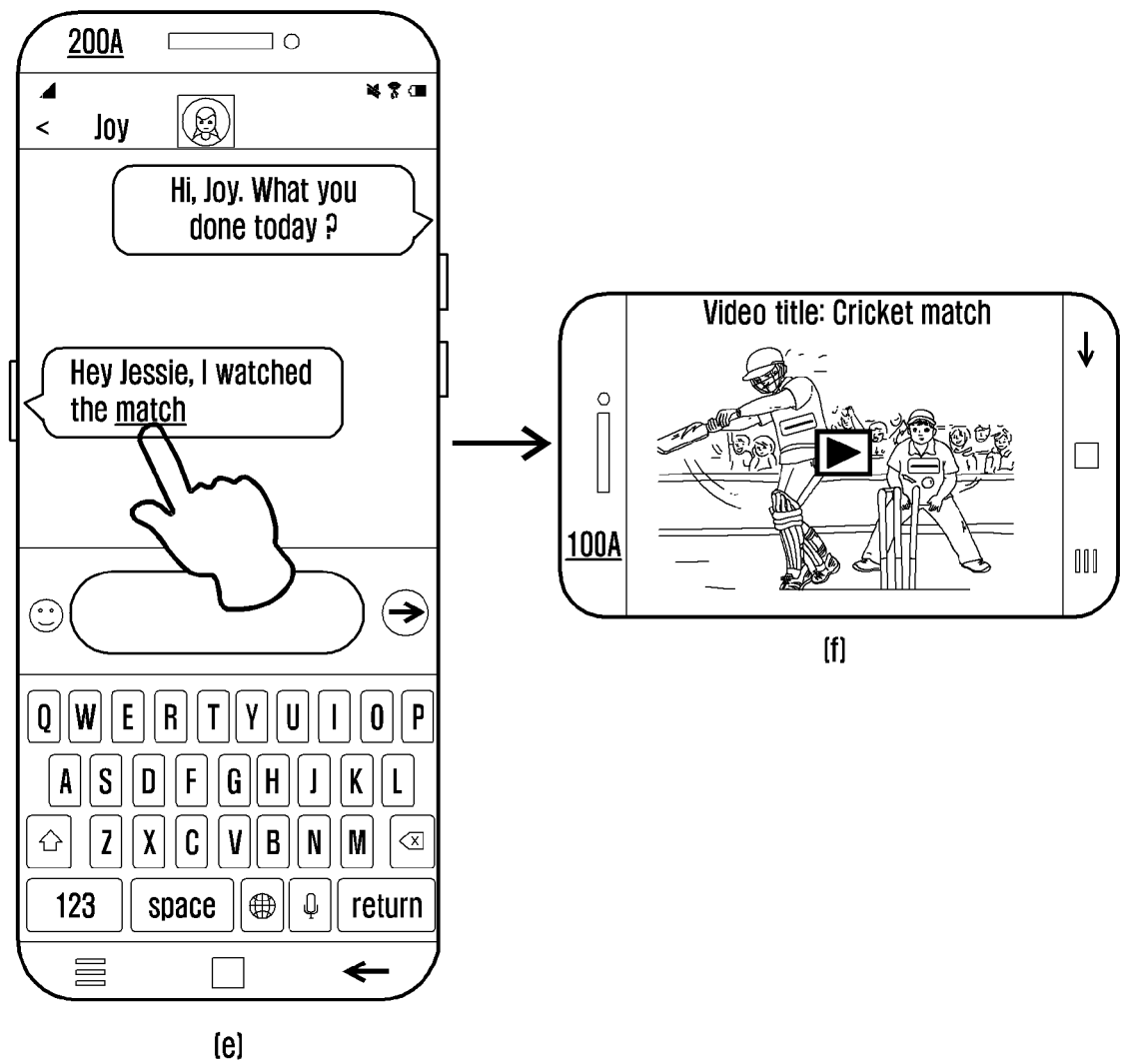

METHOD AND SYSTEM FOR PREDICTING CONTENT BASED RECOMMENDATIONS

CROSS-REFERENCE TO RELATED APPLICATIONS

This application is a 371 of International Application No. PCT/KR2019/015778 filed on Nov. 18, 2019, which claims priority to India Patent Application No. 201841043507 filed on Nov. 19, 2018 and India Patent Application No. 201841043507 filed on Nov. 5, 2019, the disclosures of which are herein incorporated by reference in their entirety.

BACKGROUND

1. Field

The present disclosure relates to electronic devices, and more specifically to a method and system for predicting content based recommendations.

2. Description of Related Art

Electrical appliances connect to a network to form an Internet of Thing (IoT) device environment, where a user can monitor and control operations of the electrical appliances using an electronic device such as smartphone, laptop etc. Conventional systems allow the user to control the operations of the electrical appliances in the IoT device environment based on a voice command received from the user. Further, the conventional systems predict an activation of an operation of the electrical appliances based on a history of user activities performed using the electrical appliances. Example for the user activities performed using the electrical appliances are watching a video in a smart television (TV), doing workout on a treadmill, etc.

In an example scenario, a user is watching the video in a first smart TV, where a control configuration of the first smart TV to watch the video includes an application used to play the video, a link of the video to fetch the video from a server, a sound level of the first smart TV in playing the video, etc. However, the conventional systems lack in sharing the control configuration of the smart TV to other electrical appliances such as a second smart TV, a smart phone etc., which are capable of applying the control configuration to play the video.

The conventional systems allow the user to manually share the link of the video, details about the application used to play the video, etc. to the other electrical appliances. However, recommending the control configuration to the user for sharing the control configuration to other electrical appliances is desirable. Thus, it is desired to at least provide a useful alternative.

The principal object of the embodiments herein is to provide a method and system for predicting content based recommendations.

Another object of the embodiments herein is to recognize content displayed on a display of a first electronic device in a first IoT network.

Another object of the embodiments herein is to generate at least one recommendation corresponding to the content based on a history of user activities performed by a user using at least one of the first electronic device and other electronic device in the first IoT network.

Another object of the embodiments herein is to provide the at least one recommendation to the user for selecting at least one recommendation.

Another object of the embodiments herein is to automatically include the at least one selected recommendation to compose a message for a user of a first electronic device in a second IoT network.

Another object of the embodiments herein is to determine at least one electronic device in the second IoT network, relevant to the at least one selected recommendation in the message.

Another object of the embodiments herein is to automatically configure at least one relevant electronic in the second IoT network based on the at least one selected recommendation.

SUMMARY

Accordingly the embodiments herein provide a method predicting content based recommendations. The method includes recognizing, by a first electronic device in a first IoT network, content displayed on a display of the first electronic device. Further, the method includes generating, by the first electronic device, at least one recommendation corresponding to the content based on a history of user activities performed by a user using at least one of the first electronic device and other electronic devices in the first IoT network. Further, the method includes displaying, by the first electronic device, the at least one recommendation on a display of the first electronic device.

In an embodiment, the method further includes detecting, by the first electronic device, the at least one recommendation selected by the user. Further, the method includes automatically including, by the first electronic device, the at least one selected recommendation to compose a message. Further, the method includes sending, by the first electronic device, the message to a second IoT network.

In an embodiment, the method further includes receiving, by the first electronic device in the second IoT network, the message including the content and the at least one selected recommendation from the first electronic device in the first IoT network. Further, the method includes determining, by the first electronic device in the second IoT network, at least one electronic device in the second IoT network, relevant to the at least one selected recommendation in the message. Further, the method includes automatically configuring, by the first electronic device in the second IoT network, at least one relevant electronic device in the second IoT network based on the at least one selected recommendation.

In an embodiment, the at least one recommendation is transferrable to other devices.

In an embodiment, generating, by the first electronic device, the at least one recommendation corresponding to the content, includes extracting, by the first electronic device, actionable data items from the displayed content, determining, by the first electronic device, the at least one electronic device in the first IoT network, relevant to the actionable data items, generating, by the first electronic device, the at least one recommendation representing the displayed content by fetching actions related to at least one relevant electronic device in the first IoT network based on a timestamp of a user activity and at least one electronic device on which the user activity is performed.

In an embodiment, the actionable data items are displayed on the first electronic device in one of a different color, an icon and a tagged user interface.

In an embodiment, the at least one recommendation indicates an information of at least one user activity performed on the at least one electronic device in the first IoT network and a control configuration for at least one electronic device in a second IoT network to perform the at least one user activity.

Accordingly the embodiments herein provide a system for predicting content based recommendations. The system includes a first IoT network and a second IoT network. A first electronic device in the first IoT network is configured to recognize content displayed on a display of the first electronic device. The first electronic device is configured to generating at least one recommendation corresponding to the content based on a history of user activities performed by a user using at least one of the first electronic device and other electronic devices in the first IoT network. The first electronic device is configured to displaying the at least one recommendation on a display of the first electronic device. For example, the first electronic device is configured to provide the at least one recommendation on an action prediction panel of a keyboard of the first electronic device. The first electronic device is configured to detect the at least one recommendation selected by the user. The first electronic device is configured to automatically include the at least one selected recommendation to compose a message. The first electronic device is configured to send the message to a second IoT network. A first electronic device in the second IoT network is configured to receive the message including the content and the at least one selected recommendation from the first electronic device. The first electronic device in the second IoT network is configured to determine at least one electronic device in the second IoT network, relevant to the at least one selected recommendation in the message. The first electronic device in the second IoT network is configured to automatically configure at least one relevant electronic device based on the at least one selected recommendation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

According to various embodiments of the present disclosure, a method and system for predicting content based recommendation may be provided.

According to various embodiments of the present disclosure, at least one recommendation corresponding to the content may be predicted based on a history of user activities performed by the first user.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which:

FIG. 1 is a block diagram of a system for predicting content based recommendations and configuring at least one relevant electronic device in a second IoT network based on at least one selected recommendation, according to an embodiment as disclosed herein;

FIG. 2 is a flow diagram illustrating a method for predicting the content based recommendations and configuring the at least one relevant electronic device in the second IoT network based on the at least one selected recommendation, according to an embodiment as disclosed herein;

FIG. 3 is a flow diagram illustrating a method for storing a semantic relation between at least one electronic device and activities of a user, according to an embodiment as disclosed herein;

FIG. 4 is a flow diagram illustrating a method for providing the at least one recommendation to the user for a content displayed on a display of the first electronic device in a first IoT network, according to an embodiment as disclosed herein;

FIG. 5 is a flow diagram illustrating a method for displaying the control information on the relevant electronic devices in the second IoT network based on the availability of the corresponding electronic device, according to an embodiment as disclosed herein;

FIGS. 6a, and 6b are a flow diagram illustrating a method for configuring the corresponding electronic device in the second IoT network based on the at least one selected recommendation, according to an embodiment as disclosed herein;

FIGS. 7a and 7b illustrate an example scenario of predicting the content based recommendations and configuring a smart TV in the second IoT network to play a video based on a selected recommendation, according to an embodiment as disclosed herein;

FIGS. 8a, 8b and 8c are a sequential diagram illustrating signaling in the system for predicting the content based recommendations and configuring the smart TV in the second IoT network to play the video based on the selected recommendation, according to an embodiment as disclosed herein;

FIGS. 9a and 9b illustrate an example scenario of predicting the content based recommendations and configuring a microwave oven in the second IoT network to bake a cake based on the selected recommendation, according to an embodiment as disclosed herein;

FIG. 10 is a flow diagram illustrating a method for providing the recommendation of the video of baking the cake watched in the smart TV to the user of a smartphone in the first IoT network, according to an embodiment as disclosed herein; and FIGS. 11a and 11b illustrate an example scenario of predicting the content based recommendations and configuring a smartphone in the second IoT network to play the video based on the selected recommendation, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g. one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a system for predicting content based recommendations. The system includes a first IoT network and a second IoT network. A first electronic device in the first IoT network is configured to recognize content displayed on a display of the first electronic device. The first electronic device is configured to predict at least one recommendation corresponding to the content based on a history of user activities performed by a user using at least one of the first electronic device and other electronic devices in the first IoT network. For example, the first electronic device is configured to generate at least one recommendation corresponding to the content based on a history of user activities performed by a user using at least one of the first electronic device and other electronic devices in the first IoT network. The first electronic device is configured to display the at least one recommendation on a display of the first electronic device. For example, the first electronic device is configured to provide the at least one recommendation on an action prediction panel of a keyboard of the first electronic device. The first electronic device is configured to detect the at least one recommendation selected by the user. The first electronic device is configured to automatically include the at least one selected recommendation to compose a message. The first electronic device is configured to send the message to a second IoT network. A first electronic device in the second IoT network is configured to receive the message including the content and the at least one selected recommendation from the first electronic device. The first electronic device in the second IoT network is configured to determine at least one electronic device in the second IoT network, relevant to the at least one selected recommendation in the message. The first electronic device in the second IoT network is configured to automatically configure at least one relevant electronic device based on the at least one selected recommendation.

Unlike to the existing methods and systems, the first electronic device generates a semantic relation of the user activities to the associated electronic devices. Further, the first electronic device classifies the user activities which related to same event to a group, where examples for the event is baking a cake, body fitness etc. The first electronic device determines and stores a control configuration of each associated electronic device while performing the user activities. In response to detecting a chat message displayed in the display, the first electronic device generates the recommendations include the control configuration based on a chat message. The first electronic device generates the recommendations based on a relation between the chat message and the event. Therefore, the control configuration in each recommendation is relevant to the chat message. The user can share at least one recommendation as an action tag (e.g. a tagged text) to other electronic devices by selecting the at least one recommendation. Further, the user can apply the control configuration in the other electronic devices to perform the user activity by selecting the action tag. Therefore, the proposed method improves the user experience in sharing the control configuration to other electronic devices.

Referring now to the drawings, and more particularly to FIGS. 1 through 11, there are shown preferred embodiments.

FIG. 1 is a block diagram of a system 1000 for predicting content based recommendations and configuring at least one relevant electronic device (first electronic device 200A-n$^{th}$ electronic device 200F) in a second IoT network 200 based on at least one selected recommendation, according to an embodiment as disclosed herein. In an embodiment, the system 1000 includes a first IoT network 100 and at least one second IoT network 200, where the first IoT network 100 is connected to the at least one second IoT network 200. The first IoT network 100 includes at least one electronic device (i.e. first electronic device 100A-n$^{th}$ electronic device 100F). A second IoT network 200 includes at least one electronic device (i.e. first electronic device 200A-n$^{th}$ electronic device 200F). Examples for the at least one electronic device (i.e. first electronic device 100A-n$^{th}$ electronic device 100F) in the first IoT network 100 and the at least one electronic device (i.e. first electronic device 200A-n$^{th}$ electronic device 200F) in the second IoT network 200 are, but not limited to a smartphone, a tablet computer, a personal computer, a desktop computer, a smart watch, a personal digital assistant (PDA), a multimedia device, an Internet of Things (IoT) or the like.

In an embodiment, the first electronic device 100A includes a processor 110A, a memory 120A, a display 130A and a communicator 140A, where the processor 110A is coupled to the memory 120A and the display 130A. In an embodiment, the processor 110A includes a content recognizer 111A, a recommendation engine 112A, a device configuration engine 113A, a sematic relation generator 114A, and a Machine Learning (ML) engine 115A. The processor 110A is configured to execute instructions stored in the memory 120A. The processor 110A is configured to detect a keyboard invocation. In an embodiment, the memory 120A includes a semantic instance relations database 121A. The memory 120A may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 120A may, in some examples, be considered a non-transitory storage medium. The term "non-transitory" may indicate that the storage medium is not embodied in a carrier wave or a propagated signal. However, the term "non-transitory" should not be interpreted that the memory 120A is non-movable. In some examples, the memory 120A can be configured to store larger amounts of information than the memory 120A. In certain examples, a non-transitory storage medium may store data that can, over time, change (e.g. in Random Access Memory (RAM) or cache).

In an embodiment, the display 130A is a touch screen display. Examples for the display 130A are, but not limited to a Liquid Crystal Display (LCD) screen, a Light Emitting Diode (LED) display screen, and the like.

The communicator 140A is configured to communicate internally between hardware components in the first electronic device 100A. Further, the communicator 140A is configured to facilitate the communication between the electronic device 100A and the second electronic device 100B-$n^{th}$ electronic device 100F. Further, the communicator 140A is configured to facilitate the communication between the electronic device 100A and the second IoT network 200.

In an embodiment, the second electronic device 100A-$n^{th}$ electronic device 100F includes similar hardware components of the first electronic device 100A. The hardware components in the second electronic device 100A-$n^{th}$ electronic device 100F performs same operations perform by the similar hardware component in the first electronic device 100A. In another embodiment, the first electronic device 100A operates as an IoT network server of the first IoT network 100.

In an embodiment, the first electronic device 200A includes a processor 210A, a memory 220A, a display 230A and a communicator 240A, where the processor 210A is coupled to the memory 220A and the display 230A. In an embodiment, the processor 210A includes a recommendation engine 211A and a device configuration engine 212A. The processor 210A is configured to execute instructions stored in the memory 220A. The processor 210A is configured to detect the keyboard invocation. The memory 220A may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 220A may, in some examples, be considered a non-transitory storage medium. The term "non-transitory" may indicate that the storage medium is not embodied in a carrier wave or a propagated signal. However, the term "non-transitory" should not be interpreted that the memory 220A is non-movable. In some examples, the memory 220A can be configured to store larger amounts of information than the memory 220A. In certain examples, a non-transitory storage medium may store data that can, over time, change (e.g. in Random Access Memory (RAM) or cache).

The communicator 240A is configured to communicate internally between hardware components in the first electronic device 200A. Further, the communicator 240A is configured to facilitate the communication between the electronic device 200A and the second electronic device 200B-$n^{th}$ electronic device 200F. Further, the communicator 140A is configured to facilitate the communication between the electronic device 200A and the first IoT network 100.

In an embodiment, the display 230A is the touch screen display. Examples for the display 230A are, but not limited to a LCD screen, a LED display screen, and the like.

In an embodiment, the second electronic device 200A-$n^{th}$ electronic device 200F includes similar hardware components of the first electronic device 200A. The hardware components in the second electronic device 100A-$n^{th}$ electronic device 100F performs same operations perform by the similar hardware component of the first electronic device 200A. In another embodiment, the first electronic device 200A operates as the IoT network server of the second IoT network 200.

The first electronic device 100A is configured to detect user activities associated with the at least one electronic device (first electronic device 100A-$n^{th}$ electronic device 100F) in the first IoT network 100. Examples for the user activities are, but not limited to, reading a description about Zumba dance in a webpage, watching a video of Yoga poses, baking a cake, doing workout, doing work out on treadmill at 10 km/h for 10 minutes, and the like. In an embodiment, the sematic relation generator 114A detects the user activities associated with the at least one electronic device (first electronic device 100A-$n^{th}$ electronic device 100F) in the first IoT network 100.

The first electronic device 100A is configured to classify the user activities related to same event to a group (e.g. a first group represents activities related to body fitness, a second group represents activities related to baking the cake, a third group represents watching a match, etc.), in response to detecting the user activities associated with the at least one electronic device (first electronic device 100A-$n^{th}$ electronic device 100F). Examples for the event are, but not limited to, the body fitness, baking the cake, watching the match. In an embodiment, the user activities are classified along with additional information of each user activity. In an embodiment, the additional information includes the at least one electronic device (first electronic device 100A-$n^{th}$ electronic device 100F) on which the user activity is performed, an application and link used to perform the user activity in the at least one electronic device (first electronic device 100A-$n^{th}$ electronic device 100F), a timestamp of each user activity, a device configuration of each electronic device (first electronic device 100A-$n^{th}$ electronic device 100F) to perform the user activity and a metadata associated with each user activity.

In an embodiment, the sematic relation generator 114A classifies the user activities related to the same event to the group, in response to detecting the user activities associated with the at least one electronic device (first electronic device 100A-$n^{th}$ electronic device 100F). In an embodiment, the sematic relation generator 114A determines data includes an information of the application used to perform the user activity, objects identified using Optical Character Recognition (OCR) technique, image recognition technique and speech to text conversion technique and a context of a user of first electronic device 100A.

Examples for the context of the user of first electronic device 100A are, but not limited to a time at which the user is performing the user activity, a location of the user of first electronic device 100A, an occasion at which the user of first electronic device 100A performs the user activity, etc. Further, the sematic relation generator 114A filters the data using available knowledge databases (e.g. wikiHow®, Reddit®) and extracts the objects which is frequently identified. Further, the sematic relation generator 114A determines a relation of the user activities with the event based on the extracted objects.

The first electronic device 100A is configured to record the classified user activities along with the additional information of each user activity. In an embodiment, the sematic relation generator 114A records the classified user activities along with the additional information of each user activity to the memory 120A.

The first electronic device 100A is configured to define a meaning to each user activity performed on various electronic device (first electronic device 100A-$n^{th}$ electronic device 100F) at various timestamp. In an embodiment, the metadata is used to define the meaning to each user activity performed on various electronic device (first electronic device 100A-$n^{th}$ electronic device 100F) at various timestamp. In an embodiment, the ML engine 115A defines the meaning of each user activity performed on the various electronic device (first electronic device 100A-$n^{th}$ electronic device 100F) at the various timestamp. In an embodiment, the meaning is defined for each user activity performed on various electronic device (first electronic device 100A-$n^{th}$ electronic device 100F) at various timestamp indicates a semantic relation of each user activity to the event. In an embodiment, the sematic relation generator 114A generates the semantic relation of each user activity to the event.

The first electronic device 100A is configured to convert each record to an action based on the semantic relation. Example for the actions include, but not limited to showing the video in a smart TV, operating the treadmill, operate a microwave oven to bake the cake. In an embodiment, the recommendation engine 112A converts each record to the action based on the meaning.

The first electronic device 100A is configured to attach an action tag with the associated electronic device (first electronic device 100A-$n^{th}$ electronic device 100F) in the first IoT network 100, where the action tag is used to control device settings of the at least one electronic device (first electronic device 200A-$n^{th}$ electronic device 200F) in the second IoT network 200. In an embodiment, the recommendation engine 112A attaches the action tag with the associated electronic device (first electronic device 100A-$n^{th}$ electronic device 100F) in the first IoT network 100.

The first electronic device 100A is configured to store the action and the action tag to the memory 120A. In an embodiment, the semantic instance relations database 121A stores the action and the action tag. The semantic instance relations database 121A stores hot words related to an actionable data item in the content. In an example scenario, "fit" is the actionable data item in the content. The first electronic device 100A detects the hot words such as Zumba, Yoga, diet plan, exercise, weight loss related to the actionable data item "fit", which stores in the semantic instance relations database 121A.

The first electronic device 100A is configured to recognize the content displayed on the display 130A of the first electronic device 100A. An example for the content is a text, an image, a video, an audio file, a sticker and the like. In an embodiment, the content is recognized by identifying the object (e.g. noun, verb, cake, Zumba dance in the image, Yoga poses in the video, etc.) in the content. In an example, the first electronic device 100A identify the objects in the content by analyzing the content using an Optical Character Recognition (OCR) technique, image recognition technique, speech to text conversion technique etc. In an embodiment, the content recognizer 111A recognizes the content displayed on the display 130A.

The first electronic device 100A is configured to determine a list of electronic devices (first electronic device 100A-$n^{th}$ electronic device 100F) relevant to the hot words. In an embodiment, the recommendation engine 112A determines the list of electronic devices (first electronic device 100A-$n^{th}$ electronic device 100F) relevant to the hot words.

The first electronic device 100A is configured to generate at least one recommendation corresponding to the content based on a history of the user activities performed using at least one of the first electronic device 100A and other electronic devices. The first electronic device 100A is configured to predict at least one recommendation corresponding to the content based on a history of the user activities performed using at least one of the first electronic device 100A and other electronic devices (second electronic device 100B-$n^{th}$ electronic device 100F) in the first IoT network 100. In an embodiment, the at least one recommendation indicates an information of at least one user activity performed on the at least one electronic device (first electronic device 100A-$n^{th}$ electronic device 100F) in the first IoT network 100 and a control configuration (i.e. IoT settings) for the at least one electronic device (first electronic device 200A-$n^{th}$ electronic device 200F) in the second IoT network 200 to perform the at least one user activity.

In an embodiment, the at least one recommendation is transferrable to the electronic devices (second electronic device 100B-$n^{th}$ electronic device 100F) in the first IoT network and the electronic devices (first electronic device 200A-$n^{th}$ electronic device 200F) in the second IoT network 200.

In an embodiment, the recommendation engine 112A predicts the at least one recommendation corresponding to the content based on the history of the user activities performed by the user using at least one of the first electronic device 100A and other electronic devices (second electronic device 100B-$n^{th}$ electronic device 100F) in the first IoT network 100. For example, the recommendation engine 112A generates the at least one recommendation corresponding to the content based on the history of the user activities performed by the user using at least one of the first electronic device 100A and other electronic devices in the first IoT network. Further, the recommendation engine 112A improvise the control configuration in the at least one recommendation by detailing the control configuration. In an example scenario, the control configuration of the microwave oven for baking the cake is 120° C. for 10 minutes. In response to improvising the control configuration, the control configuration is modified to: switch on the microwave when the voltage is in between a range of 200V-220V, set a temperature of an air conditioner to 28° C., set a temperature of microwave oven to 120° C. for 10 minutes, when a door of the microwave oven is closed.

In another embodiment, the first electronic device 100A is configured to extract actionable data items from the displayed content. In an embodiment, the actionable data items are displayed on the first electronic device 100A in one of a different color, an icon and a tagged User Interface (UI). In an embodiment, the content recognizer 111A extracts the actionable data items from the displayed content. The first electronic device 100A is configured to determine the at least one electronic device (first electronic device 100A-$n^{th}$ electronic device 100F) in the first IoT network 100), relevant to the actionable data items.

In an embodiment, the ML engine 115A determines the at least one electronic device (first electronic device 100A-$n^{th}$ electronic device 100F) in the first IoT network 100), relevant to the actionable data items. The first electronic device 100A is configured to short list and sort the relevant electronic device (first electronic device 100A-$n^{th}$ electronic device 100F) in an order by referring to the records in the memory 120A. In an embodiment, the recommendation engine 112A short lists and sorts the relevant electronic device (first electronic device 100A-$n^{th}$ electronic device 100F) in the order by referring to the records in the memory 120A.

The first electronic device 100A is configured to predict the at least one recommendation representing the displayed content by fetching actions related to at least one relevant electronic device (first electronic device 100A-$n^{th}$ electronic device 100F) in the first IoT network 100 based on a timestamp of the user activity and at least one electronic device (first electronic device 100A-$n^{th}$ electronic device 100F) on which the user activity is performed. In an embodiment, the first electronic device 100A is configured to generate the at least one recommendation representing the displayed content by fetching actions related to at least one relevant electronic device in the first IoT network 100 based on a timestamp of the user activity and at least one electronic device on which the user activity is performed. In an embodiment, the recommendation engine 112A predicts (or generate) the at least one recommendation representing the displayed content by fetching the actions related to the at least one relevant electronic device (first electronic device 100A-$n^{th}$ electronic device 100F) in the first IoT network 100 based on the timestamp of the user activity and at least one electronic device (first electronic device 100A-$n^{th}$ electronic device 100F) on which the user activity is performed. The actions related to the electronic device (first electronic device 100A-$n^{th}$ electronic device 100F) are predicted in the sorted order in the list by the recommendation engine 112A for fetching the actions in the sorted order.

The first electronic device 100A is configured to display the at least one recommendation on a display of the first electronic device. In an embodiment, the first electronic device 100A is configured to provide the at least one recommendation on an action prediction panel (not shown) of a keyboard (not shown) of the first electronic device 100A, where the keyboard displays on the display 130A. In an example, the action prediction panel is a space in the keyboard located above uppermost keys in the keyboard. In an embodiment, the recommendation displays as a representation of at least one of the user activity, the electronic device (first electronic device 100A-$n^{th}$ electronic device 100F) associated with the user activity, the application associated with the user activity. In an embodiment, the recommendation engine 112A displays the at least one recommendation on a display 130A of the first electronic device 100A In an embodiment, the recommendation engine 112A provides the at least one recommendation on the action prediction panel of the keyboard of the first electronic device 100A. In an embodiment, predictions overlays on the action prediction panel of the keyboard of the first electronic device 100A for providing the at least one recommendation to the user.

The first electronic device 100A is configured to detect the at least one recommendation selected by the user. In an example, the user taps on the at least one recommendation displayed on the display 130A, for selecting at least one recommendation. In an embodiment, the recommendation engine 112A detects the at least one recommendation selected by the user. The first electronic device 100A is configured to automatically include the at least one selected recommendation to compose a message. Examples for the message are a text message, a voice call, a video call, a voice message, an image, a video message, a sticker and the like. In an embodiment, the device configuration engine 113A automatically includes the at least one selected recommendation to compose the message. In an embodiment, the at least one selected recommendation is included in the message by attaching the action tag to the message.

The first electronic device 100A is configured to send the message to the second IoT network 200. In an embodiment, the device configuration engine 113A sends the message to the second IoT network 200.

The second electronic device 200A is configured to receive the message including the content and the at least one selected recommendation from the first electronic device 100A. In an embodiment, the recommendation engine 211A receives the message including the content and the at least one selected recommendation from the first electronic device 100A. The second electronic device 200A is configured to identify the selected recommendation with which the electronic devices (first electronic device 100A-$n^{th}$ electronic device 100F) in the first IoT network 100 are tagged. The recommendation engine 211A identifies the selected recommendation with which the electronic devices (first electronic device 100A-$n^{th}$ electronic device 100F) in the first IoT network 100 are tagged.

The second electronic device 200A is configured to determine the at least one electronic device (first electronic device 200A-$n^{th}$ electronic device 200F) in the second IoT network 200, relevant to the at least one selected recommendation in the message. In an embodiment, the device configuration engine 212A determines the at least one electronic device (first electronic device 200A-$n^{th}$ electronic device 200F) in the second IoT network 200, relevant to the at least one selected recommendation in the message. The first electronic device 200A is configured to automatically configure the at least one relevant electronic device (first electronic device 200A-$n^{th}$ electronic device 200F) based on the at least one selected recommendation. In an embodiment, the device configuration engine 212A automatically configures the at least one relevant electronic device (first electronic device 200A-$n^{th}$ electronic device 200F) based on the at least one selected recommendation.

In another embodiment, the device configuration engine 212A determines whether the at least one electronic device (first electronic device 200A-$n^{th}$ electronic device 200F) is available in the second IoT network 100 corresponds to the at least one electronic device (first electronic device 100A-$n^{th}$ electronic device 100F) in the second IoT network 200, in response to receiving the message from the first electronic device 100A by the first electronic device 200A. The device configuration engine 212A automatically configures the at least one electronic device (first electronic device 200A-$n^{th}$ electronic device 200F) available in the second IoT network 200 based on the at least one selected recommendation, when the at least one electronic device (first electronic device 200A-$n^{th}$ electronic device 200F) is available in the second IoT network 100 corresponds to the at least one electronic device (first electronic device 100A-$n^{th}$ electronic device 100F) in the second IoT network 200.

The device configuration engine 212A determines at least one electronic device (first electronic device 200A-$n^{th}$ electronic device 200F) in the second IoT network 200 which is relevant to the at least one selected recommendation, when the at least one electronic device (first electronic device 200A-$n^{th}$ electronic device 200F) is unavailable in the second IoT network 100 corresponds to the at least one electronic device (first electronic device 100A-$n^{th}$ electronic device 100F) in the second IoT network 200. Further, the device configuration engine 212A is configured to display the recommendation on the at least one relevant electronic device (first electronic device 200A-$n^{th}$ electronic device 200F) in the second IoT network 200.

In another embodiment, the device configuration engine 212A analyzes the control configuration for the electronic devices (first electronic device 100A-$n^{th}$ electronic device 100F) in second IoT network 200, in response to receiving the message from the first electronic device 100A by the first electronic device 200A. Further, the device configuration engine 212A determines whether the corresponding electronic device (first electronic device 200A-$n^{th}$ electronic device 200F) is available in second IoT network 200. The device configuration engine 212A applies the control configuration on the corresponding electronic devices (first electronic device 200A-n$^{th}$ electronic device 200F), when the corresponding electronic device (first electronic device 200A-n$^{th}$ electronic device 200F) is available in second IoT network 200. The device configuration engine 212A determine and sort nearby relevant electronic devices (first electronic device 200A-n$^{th}$ electronic device 200F), when the corresponding electronic device (first electronic device 200A-n$^{th}$ electronic device 200F) is unavailable in second IoT network 200. Further, the device configuration engine 212A is configured to display the control configuration as a text on the display (not shown) of the relevant electronic devices (first electronic device 200A-n$^{th}$ electronic device 200F).

In another embodiment, the device configuration engine 212A determines whether the at least one electronic device (first electronic device 200A-n$^{th}$ electronic device 200F) is available for a user of the second electronic device 200A, in response to receiving the message from the first electronic device 100A by the first electronic device 200A. Further, the device configuration engine 212A deletes the message, when the at least one electronic device (first electronic device 200A-n$^{th}$ electronic device 200F) is unavailable for the user of the second electronic device 200A. The device configuration engine 212A queries the list of electronic device (first electronic device 200A-n$^{th}$ electronic device 200F) available for the user to the IoT network server in the second IoT network 200, when the at least one electronic device (first electronic device 200A-n$^{th}$ electronic device 200F) is available for the user of the second electronic device 200A.

The device configuration engine 212A determines whether the electronic device (first electronic device 200A-n$^{th}$ electronic device 200F) is compatible to Open Connectivity Foundation (OCF) or other IoT compatibility standards. The device configuration engine 212A queries device properties of the similar electronic device (first electronic device 200A-n$^{th}$ electronic device 200F), when the electronic device (first electronic device 200A-n$^{th}$ electronic device 200F) is compatible to the OCF or the other IoT compatibility standards. Examples for the device properties are, but not limited to a capability of the device to play the video, a capability of the device to play an audio, a capability of the device to display a text, etc.

The device configuration engine 212A determines whether the electronic device (first electronic device 200A-n$^{th}$ electronic device 200F) supports by proprietary technologies/certifications (e.g. Work With SmartThings (WWST), works with Alexa, Compatible with SmartThings (CST), etc.), when the electronic device (first electronic device 200A-n$^{th}$ electronic device 200F) is incompatible to the OCF or the other IoT compatibility standards. The device configuration engine 212A performs non-standard conversion of control configuration based on the first electronic device 200A in the second IoT network 200, when the electronic device (first electronic device 200A-n$^{th}$ electronic device 200F) does not support by the proprietary technologies/certifications.

Further, the device configuration engine 212A generates the list of the electronic devices (first electronic device 200A-n$^{th}$ electronic device 200F) where the first electronic device 200A have the access. The device configuration engine 212A queries the device properties of the similar electronic device (first electronic device 200A-n$^{th}$ electronic device 200F), when the electronic device (first electronic device 200A-n$^{th}$ electronic device 200F) supports by the proprietary technologies/certifications. Further, the device configuration engine 212A determines whether the device properties of the first electronic device 200A in the second IoT network 200 are same to the device properties of first electronic device 100A in the first IoT network 100. The device configuration engine 212A determines base properties of both the electronic devices (i.e. first electronic device 100A and first electronic device 200A) and attach the base properties, when the device properties of first electronic device 200A in the second IoT network 200 are not same to the device properties of the first electronic device 100A in the first IoT network 100. The base properties are a set of device properties which are available common in both the first electronic device 100A and the first electronic device 200A.

The device configuration engine 212A attaches the device properties, when the device properties of the first electronic device 200A in the second IoT network 200 are same to the device properties of first electronic device 100A in the first IoT network 100. In response to attaching the device properties or the base prosperities, the device configuration engine 212A generates the list of the electronic devices (first electronic device 200A-n$^{th}$ electronic device 200F) where the first electronic device 200A have the access. Further, the device configuration engine 212A sorts the electronic devices (first electronic device 200A-n$^{th}$ electronic device 200F) based on a preference and a context of the user of the first electronic device 200A.

In an example scenario, the user of first electronic device 200A prefers to watch the video in the smart TV apart from watching the video in the smartphone. Examples for the context of the user of first electronic device 200A include, but not limited to a time at which the user of the first electronic device 200A views the message, a location of the user of the first electronic device 200A, an occasion at which the user of the first electronic device 200A receives the message, etc. The device configuration engine 212A selects the recommendation based on the user selection. Further, the device configuration engine 212A applies the control configuration in the corresponding electronic device (first electronic device 200A-n$^{th}$ electronic device 200F).

Although the FIG. 1 shows the hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function for predicting content based recommendations and configuring at least one relevant electronic device (first electronic device 200A-n$^{th}$ electronic device 200F) in the second IoT network 200 based on the at least one selected recommendation.

FIG. 2 is a flow diagram 2000 illustrating a method for predicting the content based recommendations and configuring the at least one relevant electronic device (first electronic device 200A-n$^{th}$ electronic device 200F) in the second IoT network 200 based on the at least one selected recommendation, according to an embodiment as disclosed herein. At 201, the method includes recognizing the content displayed on the display 130A of the first electronic device 100A. In an embodiment, the method allows the content recognizer 111A to recognize the content displayed on the display 130A of the first electronic device 100A. At 202, the method includes predicting the at least one recommendation corresponding to the content based on the history of the user activities performed by the user using at least one of the first electronic device 100A and other electronic devices (second electronic device 100B-n$^{th}$ electronic device 100F) in the first IoT network 100. In an embodiment, the method includes generating the at least one recommendation corresponding to the content based on the history of the user activities performed by the user using at least one of the first electronic device 100A and other electronic devices (second electronic device 100B-n$^{th}$ electronic device 100F) in the first IoT network 100. In an embodiment, the method allows the recommendation engine 112A to predict the at least one recommendation corresponding to the content based on the history of the user activities performed by the user using at least one of the first electronic device 100A and other electronic devices (second electronic device 100B-n$^{th}$ electronic device 100F) in the first IoT network 100.

At 203, the method includes providing the at least one recommendation on the action prediction panel of the keyboard of the first electronic device 100A. In an embodiment, the method includes displaying the at least one recommendation on a display 130A of the first electronic device 100A. In an embodiment, the method allows the recommendation engine 112A to provide the at least one recommendation on the action prediction panel of the keyboard of the first electronic device 100A. At 204, the method includes detecting the at least one recommendation selected by the user. In an embodiment, the method allows the recommendation engine 112A to detect the at least one recommendation selected by the user. At 205, the method includes automatically including the at least one selected recommendation to compose the message. In an embodiment, the method allows the device configuration engine 113A to automatically include the at least one selected recommendation to compose the message. At 206, the method includes sending the message to the second IoT network 200. In an embodiment, the method allows the device configuration engine 113A to send the message to the second IoT network 200. At 207, the method includes receiving the message including the content and the at least one selected recommendation from the first electronic device 100A. In an embodiment, the method allows the recommendation engine 211A to receive the message including the content and the at least one selected recommendation from the first electronic device 100A.

At 208, the method includes determining whether the at least one electronic device (first electronic device 200A-n$^{th}$ electronic device 200F) is available in the second IoT network 200 corresponds to the at least one electronic device (first electronic device 100A-n$^{th}$ electronic device 100F) in the first IoT network 100. In an embodiment, the method allows the device configuration engine 212A to determine whether the at least one electronic device (first electronic device 200A-n$^{th}$ electronic device 200F) is available in the second IoT network 200 corresponds to the at least one electronic device (first electronic device 100A-n$^{th}$ electronic device 100F) in the first IoT network 100. At 209, the method includes automatically configuring the at least one electronic device (first electronic device 200A-n$^{th}$ electronic device 200F) available in the second IoT network 200 based on the at least one selected recommendation, when the at least one electronic device (first electronic device 200A-n$^{th}$ electronic device 200F) is available in the second IoT network 200 corresponds to the at least one electronic device (first electronic device 100A-n$^{th}$ electronic device 100F) in the first IoT network 100. In an embodiment, the method allows the device configuration engine 212A to automatically configure the at least one electronic device (first electronic device 200A-n$^{th}$ electronic device 200F) available in the second IoT network 200 based on the at least one selected recommendation, when the at least one electronic device (first electronic device 200A-n$^{th}$ electronic device 200F) is available in the second IoT network 200 corresponds to the at least one electronic device (first electronic device 100A-n$^{th}$ electronic device 100F) in the first IoT network 100.

At 210, the method includes determining the at least one electronic device (first electronic device 200A-n$^{th}$ electronic device 200F) in the second IoT network 200 which is relevant to the at least one selected recommendation, when the at least one electronic device (first electronic device 200A-n$^{th}$ electronic device 200F) is unavailable in the second IoT network 200 corresponds to the at least one electronic device (first electronic device 100A-n$^{th}$ electronic device 100F) in the first IoT network 100. In an embodiment, the method allows the device configuration engine 212A to determines the at least one electronic device (first electronic device 200A-n$^{th}$ electronic device 200F) in the second IoT network 200 which is relevant to the at least one selected recommendation, when the at least one electronic device (first electronic device 200A-n$^{th}$ electronic device 200F) is unavailable in the second IoT network 200 corresponds to the at least one electronic device (first electronic device 100A-n$^{th}$ electronic device 100F) in the first IoT network 100. At 211, the method includes displaying the recommendation on the at least one relevant electronic device (first electronic device 200A-n$^{th}$ electronic device 200F) in the second IoT network 200. In an embodiment, the method allows the device configuration engine 212A to display the recommendation on the at least one relevant electronic device (first electronic device 200A-n$^{th}$ electronic device 200F) in the second IoT network 200.

The various actions, acts, blocks, steps, or the like in the flow diagram 2000 may be performed in the order presented, in a different order or simultaneously. Further, in some embodiments, some of the actions, acts, blocks, steps, or the like may be omitted, added, modified, skipped, or the like without departing from the scope of the invention.

FIG. 3 is a flow diagram 3000 illustrating steps in storing the semantic relation between at least one electronic device (first electronic device 100A-n$^{th}$ electronic device 100F) and activities of the user, according to an embodiment as disclosed herein. At 301, the method includes detecting the user activities associated with the at least one electronic device (first electronic device 100A-n$^{th}$ electronic device 100F) in the first IoT network 100. In an embodiment, the method allows the sematic relation generator 114A to detect the user activities associated with the at least one electronic device (first electronic device 100A-n$^{th}$ electronic device 100F) in the first IoT network 100. At 302, the method includes classifying the activities related to the same event to the group. In an embodiment, the method allows the sematic relation generator 114A to classify the activities related to the same event to the group. At 303, the method includes recording the classified user activities along with the additional information of each user activity. In an embodiment, the method allows the sematic relation generator 114A to record the classified user activities along with the additional information of each user activity. At 304, the method includes defining the meaning to each user activity performed on various electronic device (first electronic device 100A-n$^{th}$ electronic device 100F) at various timestamp. In an embodiment, the method allows the ML engine 115A to define the meaning to each user activity performed on various electronic device (first electronic device 100A-n$^{th}$ electronic device 100F) at various timestamp.

At 305, the method includes converting each record to the action based on the meaning. In an embodiment, the method allows the recommendation engine 112A to convert each record to the action based on the meaning. At 306, the method includes attaching the action tag with the associated electronic device (first electronic device 100A-n$^{th}$ electronic device 100F) in the first IoT network 100, where the action tag is used to control the device settings of the at least one electronic device (first electronic device 200A-n$^{th}$ electronic device 200F) in the second IoT network 200. In an embodiment, the method allows the recommendation engine 112A to attach the action tag with the associated electronic device (first electronic device 100A-n$^{th}$ electronic device 100F) in the first IoT network 100, where the action tag is used to control the device settings of the at least one electronic device (first electronic device 200A-n$^{th}$ electronic device 200F) in the second IoT network 200. At 307, the method includes storing the action and the action tag. In an embodiment, the method allows the semantic instance relations database 121A to stores the action and the action tag.

The various actions, acts, blocks, steps, or the like in the flow diagram 3000 may be performed in the order presented, in a different order or simultaneously. Further, in some embodiments, some of the actions, acts, blocks, steps, or the like may be omitted, added, modified, skipped, or the like without departing from the scope of the invention.

FIG. 4 is a flow diagram 4000 illustrating steps in providing the at least one recommendation to the user for the content displayed on the display 130 of the first electronic device 100A in the first IoT network 100, according to an embodiment as disclosed herein. At 401, the method includes analyzing the content using the OCR and image recognition techniques for determining the actionable data items related to the event. In an embodiment, the method allows the content recognizer 111A to analyze the content using the OCR and image recognition techniques for determining the actionable data items related to the event. At 402, the method includes identifying the electronic devices (first electronic device 100A-n$^{th}$ electronic device 100F) in the first IoT network 100 which are relevant to the actionable data items in the content. In an embodiment, the method allows the recommendation engine 112A to identify the electronic devices (first electronic device 100A-n$^{th}$ electronic device 100F) in the first IoT network 100 which are relevant to the actionable data items in the content.

At 403, the method includes short listing and sorting the relevant electronic devices (first electronic device 100A-n$^{th}$ electronic device 100F) by referring to the records in the memory 120A. In an embodiment, the method allows the recommendation engine 112A to short list and sort the relevant electronic devices (first electronic device 100A-n$^{th}$ electronic device 100F) by referring to the records in the memory 120A. At 404, the method includes predicting the actions associated with the relevant electronic devices (first electronic device 100A-n$^{th}$ electronic device 100F) in the sorted order in the list. In an embodiment, the method includes generating the actions associated with the relevant electronic devices (first electronic device 100A-n$^{th}$ electronic device 100F) in the sorted order in the list. In an embodiment, the method allows the recommendation engine 112A to predict the actions associated with the relevant electronic devices (first electronic device 100A-n$^{th}$ electronic device 100F) in the sorted order in the list. In an embodiment, the method allows the recommendation engine 112A to generate the actions associated with the relevant electronic devices (first electronic device 100A-n$^{th}$ electronic device 100F) in the sorted order in the list. At 405, the method includes overlaying the recommendations on the display of the first electronic device. In embodiment, the method includes overlaying the recommendations on the action prediction panel of the keyboard of the first electronic device 100A. In an embodiment, the method allows the recommendation engine 112A to overlay the recommendations on the action prediction panel of the keyboard of the first electronic device 100A.

At 406, the method includes creating the message with attached action tag includes the control configuration based on the user selection on the recommendation. In an embodiment, the method allows the device configuration engine 113A to create the message with attached action tag includes the control configuration based on the user selection on the recommendation. At 407, the method includes sending the message to the second IoT network 200. In an embodiment, the method allows the device configuration engine 113A to send the message to the second IoT network 200.

The various actions, acts, blocks, steps, or the like in the flow diagram 4000 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a flow diagram 5000 illustrating steps in displaying the control information on the relevant electronic devices (first electronic device 200A-n$^{th}$ electronic device 200F) in the second IoT network 200 based on the availability of the corresponding electronic device (first electronic device 200A-n$^{th}$ electronic device 200F), according to an embodiment as disclosed herein. At 501, the method includes analyzing the control configuration for the electronic devices (first electronic device 200A-n$^{th}$ electronic device 200F) in the second IoT network 200. In an embodiment, the method allows the device configuration engine 212A to analyze the control configuration for the electronic devices (first electronic device 200A-n$^{th}$ electronic device 200F) in the second IoT network 200.

At 502, the method includes determining whether the corresponding electronic device (first electronic device 200A-n$^{th}$ electronic device 200F) is available in the second IoT network 200 based on the control configuration. In an embodiment, the method allows the device configuration engine 212A to determine whether the corresponding electronic device (first electronic device 200A-n$^{th}$ electronic device 200F) is available in the second IoT network 200 based on the control configuration. At 503, the method includes applying the control configuration on the corresponding electronic devices (first electronic device 200A-n$^{th}$ electronic device 200F), when the corresponding electronic device (first electronic device 200A-n$^{th}$ electronic device 200F) is available in the second IoT network 200. In an embodiment, the method allows the device configuration engine 212A to apply the control configuration on the corresponding electronic devices (first electronic device 200A-n$^{th}$ electronic device 200F), when the corresponding electronic device (first electronic device 200A-n$^{th}$ electronic device 200F) is available in the second IoT network 200.

At 504, the method includes determining and sorting the relevant devices, when the corresponding electronic device (first electronic device 200A-n$^{th}$ electronic device 200F) is unavailable in the second IoT network 200. In an embodiment, the method allows the device configuration engine 212A to determine and sort the relevant devices, when the corresponding electronic device (first electronic device 200A-n$^{th}$ electronic device 200F) is unavailable in the second IoT network 200. At 502, the method includes displaying the control information on the relevant electronic devices (first electronic device 200A-n$^{th}$ electronic device 200F). In an embodiment, the method allows the device configuration engine 212A to display the control information on the relevant electronic devices (first electronic device 200A-n$^{th}$ electronic device 200F).

The various actions, acts, blocks, steps, or the like in the flow diagram 5000 may be performed in the order presented, in a different order or simultaneously. Further, in some embodiments, some of the actions, acts, blocks, steps, or the like may be omitted, added, modified, skipped, or the like without departing from the scope of the invention.

FIGS. 6a and 6b are a flow diagram 6000 illustrating steps in configuring the corresponding electronic device (first electronic device 200A-n$^{th}$ electronic device 200F) in the second IoT network 200 based on the at least one selected recommendation, according to an embodiment as disclosed herein. At 601, the method includes receiving the message includes the content and the selected recommendation. At 602, the method includes identifying the selected recommendation with which the electronic devices (first electronic device 100A-n$^{th}$ electronic device 100F) in the first IoT network 100 are tagged, where the selected recommendation shows in the different color or tagged UI. At 603, the method includes determining whether the at least one electronic device (first electronic device 200A-n$^{th}$ electronic device 200F) is available for the user of the second electronic device 200A.

At 604, the method includes deleting the message, when the at least one electronic device (first electronic device 200A-n$^{th}$ electronic device 200F) is unavailable for the user of the second electronic device 200A. At 605, the method includes querying the list of electronic device (first electronic device 200A-n$^{th}$ electronic device 200F) available for the user to the IoT network server in the second IoT network 200, when the at least one electronic device (first electronic device 200A-n$^{th}$ electronic device 200F) is available for the user of the second electronic device 200A. At 606, the method includes determining whether the electronic device (first electronic device 200A-n$^{th}$ electronic device 200F) is compatible to the OCF or the other IoT compatibility standards. Further, at 609, the method includes querying the device properties of the similar electronic device (first electronic device 200A-n$^{th}$ electronic device 200F), when the electronic device (first electronic device 200A-n$^{th}$ electronic device 200F) is compatible to the OCF or the other IoT compatibility standards. At 607, the method includes determining whether the electronic device (first electronic device 200A-n$^{th}$ electronic device 200F) supports by the proprietary technologies/certifications, when the electronic device (first electronic device 200A-n$^{th}$ electronic device 200F) is incompatible to the OCF or the other IoT compatibility standards. The method includes performing step 609, when the electronic device 100A the electronic device (first electronic device 200A-n$^{th}$ electronic device 200F) supports by the proprietary technologies/certifications.

At 608, the method includes performing the non-standard conversion of the control configuration based on the first electronic device 200A in the second IoT network 200, when the electronic device (first electronic device 200A-n$^{th}$ electronic device 200F) does not support by the proprietary technologies/certifications. Further, at 613, the method includes generating the list of the electronic devices (first electronic device 200A-n$^{th}$ electronic device 200F) where the first electronic device 200A have the access. At 610, the method includes determining whether the device properties of the first electronic device 200A in the second IoT network 200 are same to the device properties of the first electronic device 100A in the first IoT network 100. At 611, the method includes determining the base properties of both the electronic devices (i.e. first electronic device 100A and first electronic device 200A) and attach the base properties, when the device properties of first electronic device 200A in the second IoT network 200 are not same to the device properties of the first electronic device 100A in the first IoT network 100. Further, the method includes performing the step 613.

At 612, the method includes attaching the device properties, when the device properties of first electronic device 200A in the second IoT network 200 are same to the device properties of first electronic device 100A in the first IoT network 100. Further, the method includes performing the step 613. At 614, the method includes sorting the electronic devices (first electronic device 200A-n$^{th}$ electronic device 200F) based on the preference and the context of the user of first electronic device 200A. At 615, the method includes selecting the recommendation based on the user selection. At 616, the method includes applying the control configuration in the corresponding electronic device (first electronic device 200A-n$^{th}$ electronic device 200F). In an embodiment, the method allows the device configuration engine 212A to perform from the step 601 to step 616.

The various actions, acts, blocks, steps, or the like in the flow diagram 6000 may be performed in the order presented, in a different order or simultaneously. Further, in some embodiments, some of the actions, acts, blocks, steps, or the like may be omitted, added, modified, skipped, or the like without departing from the scope of the invention.

FIGS. 7a and 7b illustrate an example scenario of predicting the content based recommendations and configuring the smart TV 200B in the second IoT network 200 to play the video based on the selected recommendation, according to an embodiment as disclosed herein. In the example scenario, a smartphone 100A is the first electronic device 100A, a smart TV 100B is the second electronic device 100B, a refrigerator 100C is the third electronic device 100C and the treadmill 100D is the fourth electronic device 100D in the first IoT network 100. The smartphone 100A is connected to the smart TV 100B, the refrigerator 100C and the treadmill 100D. In the example scenario, a smartphone 200A is the first electronic device 200A, a smart TV 200B is the second electronic device 200B in the second IoT network 200. The smartphone 200A is connected to the smart TV 200B. Further, the first IoT network 100 is connected to the second IoT network 200. Joy is the user of the smartphone 100A. Jessie the user of the smartphone 200A. The smartphone 100A and the smartphone 200A are supported by the proprietary technologies/certifications.

Consider, that Joy has read a journal on Zumba dance for fit body in the smartphone 100A at 6 AM of a day as shown in notation (a) of the FIG. 7a, where the journal is browsed using a browser application in the smartphone 100A. The smartphone 100A detects the user activity of reading the journal in the smartphone 100A. Further, the smartphone 100A determines that the user activity of reading the journal is related to body fitness, where the body fitness is the event in the example scenario. Further, the smartphone 100A classifies the user activity of reading the journal to a first group based on the relation of the user activity to the event. Further, the smartphone 100A records the control configuration of the smartphone 100A to provide the journal.

Consider, that Joy has seen a video of Yoga poses in the smart TV 100B at 8 AM of the day as shown in notation (b) of the FIG. 7a, where the video is played using a video player application in the smart TV 100B. The smartphone 100A detects the user activity of watching the video in the smart TV 100B. Further, the smartphone 100A determines that the user activity of watching the video is related to the body fitness. Further, the smartphone 100A classifies the user activity of watching the video to the first group based on the relation of the user activity to the event. Further, the smartphone 100A records the control configuration of the smart TV 100B to provide the video.

Consider that Joy has consumed a set of food for the day based on a diet plan from the refrigerator 100C at 10 AM of the day as shown in notation (c) of the FIG. 7a, where Joy takes different set of food in each day based on the diet plan. The smartphone 100A detects the user activity of consuming the set of food from the refrigerator 100C. Further, the smartphone 100A determines that the user activity of taking the set of food based on the diet plan is related to the body fitness. Further, the smartphone 100A classifies the user activity of taking the set of food to the first group based on the relation of the user activity to the event. Further, the smartphone 100A records the control configuration of the refrigerator 100C to provide the diet plan.

Consider, that Joy has exercised on the treadmill 100D at 5 km/h speed for 10 minutes at 5 PM of the day as shown in notation (d) of the FIG. 7a. The smartphone 100A detects the user activity of exercising on the treadmill 100D. Further, the smartphone 100A determines that the user activity of exercising is related to the body fitness. Further, the smartphone 100A classifies the user activity of exercising to the first group based on the relation. Further, the smartphone 100A records the control configuration of the treadmill 100D to operate at 5 km/h speed for 10 minutes.

Consider, Joy receives a text message "Hi, you look so fit in your profile picture. What is the secret?" in the smartphone 100A from Jessie as shown in notation (e) of the FIG. 7b. Joy inputs as "I followed" in the keyboard for providing a reply to the text message. In response to detecting the user input on the keyboard, the smartphone 100A detects the object "fit" as the actionable data item. Further, the smartphone 100A extracts the actionable data item in the text message. Further, the smartphone 100A determines the electronic devices in the first group as the relevant electronic devices based on the relation of the actionable data item and the user activities classified in the first group. Further, the smartphone 100A generates four recommendations representing the user activity on each relevant electronic device. In an embodiment, the smartphone 100A predicts four recommendations representing the user activity on each relevant electronic device. Further, the smartphone 100A sorts the four recommendations in the order based on the timestamp of each user activity. Further, the smartphone 100A displays the four recommendations in the sorted order to Joy. In an embodiment, the smartphone 100A provides the four recommendations in the sorted order to Joy. In response to detecting the user selection on the recommendation represents the user activity of watching the video on the smart TV 100B, the smartphone 100A inserts the action tag "video" in the reply message as the icon. The action tag "video" includes the control configuration of the smart TV 100B.

Consider, Joy sends the reply message to Jessie. In response to receiving the reply message, the smartphone 200A detects the action tag "video" in the reply message as shown in notation (f) of the FIG. 7b. Further, the smartphone 200A determines the control configuration associated with the action tag. Further, the smartphone 200A determines that the smart TV 200B as the corresponding electronic device to apply the control configuration in the second IoT network 200. In response to receiving the user selection on the action tag from Jessie, the smartphone 200A applies the control configuration to the smart TV 200B to play the video of Yoga poses as shown in notation (g) of the FIG. 7b.

FIGS. 8a, 8b and 8c are a sequential diagram illustrating signaling in the system 1000 for predicting the content based recommendations and configuring the smart TV 200B in the second IoT network 200 to play the video based on the selected recommendation, according to an embodiment as disclosed herein. The sematic relation generator 114A determines (801) the user activities associated with the smartphone 100A-treadmill 100D performed at various instances. Further, the sematic relation generator 114A generates (802) the semantic relation of each user activity with the smartphone 100A-treadmill 100D. The sematic relation generator 114A classifies the user activities to the first group based on the relation of the user activity to the event. The device configuration engine 113A determines the control configuration of the smartphone 100A-treadmill 100D. Further, the sematic relation generator 114A sends (803) the semantic relation to the semantic instance relations database 121A. The semantic instance relations database 121A stores (804) the semantic relation and the control configuration associated with the smartphone 100A-treadmill 100D.

Consider, that Joy receives a text message "Hi, you look so fit in your profile picture. What is the secret?" in the smartphone 100A from the smartphone 200A. In response to detecting (805) the invocation on the keyboard while Joy provides the input to the smartphone 100A for sending the reply message "I followed", the processor 120 sends (806) the displayed content to the content recognizer 111A. The content recognizer 111A identifies (807) the object "fit" as the actionable data item in the content. Further, the content recognizer 111A requests (808) to the semantic instance relations database 121A to provide the hot words related to the actionable data item. Further, the recommendation engine 112A fetches (809) the hot words "Zumba, Yoga, diet plan, exercise and weight loss" which are related to the actionable data item from the semantic instance relations database 121A, in response to sending the request to the semantic instance relations database 121A by the content recognizer 111A.

Further, the recommendation engine 112A determines (810) the list of electronic devices (smartphone 100A-threadmill 100D) relevant to the hot words from the first group based on the metadata in the semantic relation. Further, the recommendation engine 112A generates the recommendations corresponding to each user activity and displays (811) the recommendations to Joy. In an embodiment, the recommendation engine 112A predicts the recommendations corresponding to each user activity and provides (811) the recommendations to Joy. In response to selecting the recommendation corresponds to the user activity of watching the video in the smart TV 100B, the recommendation engine 112A detects (812) the selected recommendation. Further, the recommendation engine 112A attaches the selected recommendation to the reply message by inserting the action tag "video" to the reply message. The action tag "video" includes the control configuration of the smart TV 100B. In response to detecting (814) the user selection for sending the reply message, the recommendation engine 112A sends (815) the reply message to the smartphone 200A.

In response to receiving the reply message from the smartphone 100A, the recommendation engine 211A identifies (815) the selected recommendation in the reply message. Further, the device configuration engine 212A detects (816) the electronic devices (smartphone 200A-smart TV 200B) available for Jessie to use, which is relevant to the recommendation. Further, the device configuration engine 212A determines (817) the compatibility of the available electronic devices (smartphone 200A-smart TV 200B) to apply the control configuration. Further, the device configuration engine 212A converts the control configuration to a suitable control configuration which is compatible for the available electronic devices (smartphone 200A-smart TV 200B), if the control configuration is not compatible to available electronic devices. The device configuration engine 212A detects that the smart TV 200B is the corresponding electronic device in the second IoT network 200, which is available for Jessie. In response to detecting (819) the user selection on the action tag in the reply message by the recommendation engine 211A, the device configuration engine 212A apply the control configuration to the smart TV 200B to play the Yoga video, which is the corresponding electronic device in the second IoT network 200.

FIGS. 9a and 9b illustrate an example scenario of predicting the content based recommendations and configuring a microwave oven 200C in the second IoT network 200 to bake the cake based on the selected recommendation, according to an embodiment as disclosed herein. In the example scenario, the smartphone 100A is the first electronic device 100A, the smart TV 100B is the second electronic device 100B, the refrigerator 100C is the third electronic device 100C and the microwave oven 100E is the fourth electronic device 100D in the first IoT network 100. The smartphone 100A is connected to the smart TV 100B, the refrigerator 100C and the microwave oven 100E. In the example scenario, the smartphone 200A is the first electronic device 200A, the smart TV 200B is the second electronic device 200B and a microwave oven 200C is the third electronic device 200C in the second IoT network 200. The smartphone 200A is connected to the smart TV 200B and the microwave oven 200C. Further, the first IoT network 100 is connected to the second IoT network 200. Joy is the user of the smartphone 100A. Jessie the user of the smartphone 200A. The smartphone 100A and the smartphone 200A are supported by the proprietary technologies/certifications.

Consider, that Joy has seen a video of cherry cake preparation in the smart TV 100B at 8 AM of the day as shown in notation (a) of the FIG. 9a, where the video is played using the video player application in the smart TV 100B. The smartphone 100A detects the user activity of watching the video in the smart TV 100B. Further, the smartphone 100A determines that the user activity of watching the video is related to baking the cake, where baking the cake is the event in the example scenario. Further, the smartphone 100A classifies the user activity of watching the video to the second group based on the relation of the user activity to the event. Further, the smartphone 100A records the control configuration of the smart TV 100B to provide the video.

Consider, that Joy has read a recipe of cherry cake displayed on the display 130C of the refrigerator 100C at 10 AM of a day as shown in notation (b) of the FIG. 9a. The smartphone 100A detects the user activity of reading the recipe in the refrigerator 100C. Further, the smartphone 100A determines that the user activity of reading the recipe is related to baking the cake. Further, the smartphone 100A classifies the user activity of reading the recipe to the second group based on the relation of the user activity to the event.

Further, the smartphone 100A records the control configuration of the refrigerator 100C to provide the recipe.

Consider, that Joy has baked the cherry cake in the microwave oven 100E at 120° C. for 10 minutes at 5 PM of the day as shown in notation (c) of the FIG. 9a. The smartphone 100A detects the user activity of baking the cherry cake using the microwave oven 100E. Further, the smartphone 100A determines that the user activity of baking the cherry cake is related to the baking the cake. Further, the smartphone 100A classifies the user activity of baking the cherry cake to the second group based on the relation of the user activity to the event. Further, the smartphone 100A records the control configuration of the microwave oven 100E to operate at 120° C. for 10 minutes.

Consider, Joy sends an image of cherry cake to Jessie. Further, Joy receives a text message "Hey, it's looking delicious, can you share the recipe" in the smartphone 100A from Jessie as shown in notation (d) of the FIG. 9a. Joy inputs as "Yes sure, this is" in the keyboard for providing the reply to the text message. In response to detecting the user input on the keyboard, the smartphone 100A detects the object "cherry, cake, recipe" as the actionable data items. Further, the smartphone 100A extracts the actionable data items in the messages displayed in the display 130A. Further, the smartphone 100A determines the electronic devices in the second group as the relevant electronic devices based on the relation of the actionable data items and the user activities classified in the second group. Further, the smartphone 100A generates three recommendations representing the user activity on each relevant electronic device. In an embodiment, the smartphone 100A predicts three recommendations representing the user activity on each relevant electronic device. Further, the smartphone 100A sorts the three recommendations in the order based on the timestamp of each user activity. Further, the smartphone 100A displays the three recommendations in the sorted order to Joy. In an embodiment, the smartphone 100A provides the three recommendations in the sorted order to Joy. In response to detecting the user selection on the recommendation represents the user activity of baking the cherry cake using the microwave oven 100E, the smartphone 100A inserts the action tag "cake's recipe" in the reply message in the different color. The action tag "cake's recipe" includes the control configuration of the microwave oven 100E.

Consider, Joy sends the reply message to Jessie. In response to receiving the reply message, the smartphone 200A detects the action tag "cake's recipe" in the reply message as shown in notation (e) of the FIG. 9b. Further, the smartphone 200A determines the control configuration associated with the action tag. Further, the smartphone 200A determines that the microwave oven 200C as the corresponding electronic device to apply the control configuration in the second IoT network 200. In response to receiving the user selection on the action tag from Jessie, the smartphone 200A applies the control configuration to the microwave oven 200C to operate at 120° C. for 10 minutes as shown in notation (f) of the FIG. 9b.

FIG. 10 is a flow diagram 10000 illustrating steps in providing the recommendation of the video of baking the cake watched in the smart TV 100B to the user of the smartphone 200A in the first IoT network 100, according to an embodiment as disclosed herein. At 1001, the method includes detecting the user activity associated with the smart TV 100, where the user activity is watching the video of cherry cake preparation. In an embodiment, the method allows the sematic relation generator 114A to detect the user activity associated with the smart TV 100. At 1002, the method includes determining the data related to the user activity. In an embodiment, the method allows the sematic relation generator 114A to determine the data related to the user activity of watching the video of cherry cake preparation. The data includes application name as video player application, the objects identified using OCR technique are cake and cherry, the object identified using the image recognition technique is cake and the user context (i.e. time: 11:30 AM, Location: Home, Occasion: None).

At 1003, the method includes filtering the data and extracting the frequent object in the data, where the frequent object is "cake" In an embodiment, the method allows the sematic relation generator 114A to filter the data and extracting the frequent object in the data. At 1004, the method includes detecting the relevant electronic devices (smart TV 100B, refrigerator 100C and microwave oven 100E) and the control configuration based on the object. In an embodiment, the method allows the recommendation engine 112A to detect the relevant electronic devices (smart TV 100B, refrigerator 100C and microwave oven 100E) based on the object. In an embodiment, the method allows the device configuration engine 113A to detect the control configuration based on the object. At 1005, the method includes storing the semantic relation includes the details of the relevant electronic devices (smart TV 100B, refrigerator 100C and microwave oven 100E) and the control configuration of the relevant electronic devices (smart TV 100B, refrigerator 100C and microwave oven 100E). In an embodiment, the method allows the semantic instance relations database 121A to store the semantic relation includes the details of the relevant electronic devices (smart TV 100B, refrigerator 100C and microwave oven 100E) and the control configuration of the relevant electronic devices (smart TV 100B, refrigerator 100C and microwave oven 100E).

At 1006, the method includes receiving the semantic relation of at least one activity performed on the at least one electronic device (smart TV 100B, refrigerator 100C and microwave oven 100E) in the first IoT network 100 from the sematic instance relation database 121A, in response to recognizing the content and invoking the keyboard of the smartphone 100A. In an embodiment, the method allows the recommendation engine 112A to receive the semantic relation of at least one activity performed on the at least one electronic device (smart TV 100B, refrigerator 100C and microwave oven 100E) in the first IoT network 100 from the sematic instance relation database 121A, in response to recognizing the content and invoking the keyboard of the smartphone 100A. At 1007, the method includes receiving the list of compatible electronic devices (smart TV 100B, refrigerator 100C and microwave oven 100E) from the video player application. In an embodiment, the method allows the recommendation engine 112A to receive the list of compatible electronic devices (smart TV 100B, refrigerator 100C and microwave oven 100E) from the video player application. At 1008, the method includes predicting the recommendation for the content displayed in the smartphone 100A based on the sematic relation and the list of compatible electronic devices (smart TV 100B, refrigerator 100C and microwave oven 100E). In an embodiment, the method includes generating the recommendation for the content displayed in the smartphone 100A based on the sematic relation and the list of compatible electronic devices (smart TV 100B, refrigerator 100C and microwave oven 100E). In an embodiment, the method allows the recommendation engine 112A to predict the recommendation for the content displayed in the smartphone 100A based on the sematic relation and the list of compatible electronic devices (smart TV 100B, refrigerator 100C and microwave oven 100E).

At 1009, the method includes improvising the control configurations. In an embodiment, the method allows the recommendation engine 112A to improvise the control configurations. At 1010, the method includes sorting the recommendations in the order based on the timestamp of the user activity. In an embodiment, the method allows the recommendation engine 112A to sort the recommendations in the order based on the timestamp of the user activity. At 1011, the method includes displaying the recommendations on the display of the first electronic device. In an embodiment, the method includes displaying the recommendations on the action prediction panel of the keyboard. In an embodiment, the method allows the device configuration engine 113A to display the recommendations on the action prediction panel of the keyboard.

The various actions, acts, blocks, steps, or the like in the flow diagram 10000 may be performed in the order presented, in a different order or simultaneously. Further, in some embodiments, some of the actions, acts, blocks, steps, or the like may be omitted, added, modified, skipped, or the like without departing from the scope of the invention.

FIGS. 11a and 11b illustrate an example scenario of predicting the content based recommendations and configuring the smartphone 200A in the second IoT network 200 to play the video based on the selected recommendation, according to an embodiment as disclosed herein. In the example scenario, the smartphone 100A is the first electronic device 100A and the smart TV 100B is the second electronic device 100B in the first IoT network 100. The smartphone 100A is connected to the smart TV 100B. In the example scenario, the smartphone 200A is the first electronic device 200A and the smart TV 200B is the second electronic device 200B in the second IoT network 200, where the smart TV 200B is unavailable to the user of the smartphone 200A. The first IoT network 100 is connected to the second IoT network 200. Joy is the user of the smartphone 100A. Jessie the user of the smartphone 200A. The smartphone 100A and the smartphone 200A are supported by the proprietary technologies/certifications.

Consider, that Joy has seen a video of football match in the smartphone 100A at 8 AM of the day as shown in notation (a) of the FIG. 11a, where the video is played using the video player application in smartphone 100A. The smartphone 100A detects the user activity of watching the video in the smartphone 100A. Further, the smartphone 100A determines that the user activity of watching the video is related to a match, where the match is the event in the example scenario. Further, the smartphone 100A classifies the user activity of watching the video to a third group based on the relation of the user activity to the event. Further, the smartphone 100A records the control configuration of the smartphone 100A to provide the video.

Consider, that Joy has seen a video of a cricket match in the smart TV 100B at 10 AM of the day as shown in notation (b) of the FIG. 11a, where the video is played using the video player application in smart TV 100B. The smartphone 100A detects the user activity of watching the video of the cricket match in the smart TV 100B. Further, the smartphone 100A determines that the user activity of watching the video of the cricket match is related to the match. Further, the smartphone 100A classifies the user activity of watching the video of the cricket match to the third group based on the relation of the user activity to the event. Further, the smartphone 100A records the control configuration of the smart TV 100B to provide the video of the cricket match.

Consider, that Joy has seen a video of cricket match in the smartphone 100A at 5 PM of the day as shown in notation (c) of the FIG. 11a, where the video is played using the video player application in smartphone 100A. The smartphone 100A detects the user activity of watching the video of the cricket match in the smartphone 100A. Further, the smartphone 100A determines that the user activity of watching the video of the cricket match is related to the match. Further, the smartphone 100A classifies the user activity of watching the video of the cricket match to the third group based on the relation of the user activity to the event. Further, the smartphone 100A records the control configuration of the smartphone 100A to provide the video of the cricket match.

Consider, Joy receives a text message "Hi, Joy. What you done today?" from Jessie as shown in notation (d) of the FIG. 11a. The user inputs as "Hey Jessie, I watched the match" in the keyboard for providing a reply to the text message. In response to detecting the user input on the keyboard, the smartphone 100A detects the object "watched, match" as the actionable data items. Further, the smartphone 100A extracts the actionable data item in the user input. Further, the smartphone 100A determines the electronic devices in the third group as the relevant electronic devices based on the relation of the actionable data item and the user activities classified in the third group. Further, the smartphone 100A predicts three recommendations representing the user activity on each relevant electronic device. In an embodiment, the smartphone 100A generates three recommendations representing the user activity on each relevant electronic device. Further, the smartphone 100A sorts the three recommendations in the order based on the timestamp of each user activity. Further, the smartphone 100A provides the three recommendations in the sorted order to the user. In an embodiment, the smartphone 100A displays the three recommendations on the display in the sorted order to the user. In response to detecting the user selection on the recommendation represents the user activity of watching the video of the cricket match on the smart TV 100B, the smartphone 100A inserts the tagged user interface to the word "match" as the action tag in the reply message. The action tag "match" includes the control configuration of the smart TV 100B.

Consider, Joy sends the reply message to Jessie. In response to receiving the reply message, the smartphone 200A detects the action tag "match" in the reply message as shown in notation (e) of the FIG. 11b. Further, the smartphone 200A determines the control configuration associated with the action tag. Further, the smartphone 200A determines that the smart TV 200B is unavailable to apply the control configuration. Further, the smartphone 200A determines that the smartphone 200A is relevant electronic device to play the video of cricket match. Further, the smartphone 200A convers the control configuration to the suitable control configuration to play the video of cricket match in the smartphone 200A. In response to receiving the user selection on the action tag from Jessie, the smartphone 200A applies the suitable control configuration to the smartphone 200A to play the video of cricket as shown in notation (f) of the FIG. 11b.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for predicting content based recommendations in an Internet of Things (IoT) environment, comprising:
   recognizing, by a first electronic device in a first IoT network, content displayed on a display of the first electronic device;
   displaying, on the display of the first electronic device, at least one recommendation corresponding to the recognized content based on a history of user activities performed by a user using at least one of the first electronic devices and other electronic devices in the first IoT network;
   detecting, by the first electronic device, a user input selecting the at least one recommendation;
   determining, by the first electronic device, control configuration information based on device properties of a second electronic device in a second IoT network; and
   sending, by the first electronic device, a message including the selected at least one recommendation and the determined control configuration information to the second electronic device in the second IoT network,
   wherein the message includes the control configuration information for setting of the second electronic device in the second IoT network,
   wherein the control configuration information specifies an action to be performed at the second electronic device in response to the user input selecting the at least one recommendation, and
   wherein device properties of the second electronic device are different from device properties of the first electronic device.

2. The method as claimed in claim 1, further comprises:
   receiving, by a second electronic device in the second IoT network, the message comprising the content and the selected at least one recommendation from the first electronic device in the first IoT network;
   determining, by the second electronic device in the second IoT network, at least one second electronic device in the second IoT network, relevant to the selected at least one recommendation in the message; and
   automatically configuring, by the second electronic device in the second IoT network, at least one relevant second electronic device in the second IoT network based on the selected at least one recommendation.

3. The method as claimed in claim 1, wherein the at least one recommendation is transferrable to the other electronic devices in the first IoT network and at least one second electronic device in a second IoT network.

4. The method as claimed in claim 1, generating, by the first electronic device, the at least one recommendation corresponding to the content, comprises:
   extracting, by the first electronic device, actionable data items from the content displayed on the display;

determining, by the first electronic device, at least one first electronic device in the first IoT network, relevant to the actionable data items; and generating, by the first electronic device, the at least one recommendation representing the content displayed on the display by fetching actions related to at least one relevant first electronic device in the first IoT network based on a timestamp of a user activity and at least one electronic device on which the user activity is performed.

5. The method as claimed in claim 4, wherein the actionable data items are displayed on the first electronic device in one of a different color, an icon and a tagged user interface, and wherein the at least one recommendation indicates an information of at least one user activity performed on the at least one of the first electronic devices in the first IoT network and a control configuration for at least one second electronic device in a second IoT network to perform the at least one user activity.

6. A system for predicting content based recommendations in an Internet of Things (IoT) environment, wherein the system comprising a first IoT network and a second IoT network in which:

a first electronic device in the first IoT network is configured to:

recognize content displayed on a display of the first electronic device, display at least one recommendation corresponding to the recognized content based on a history of user activities performed by a user using at least one of the first electronic device and other electronic devices in the first IoT network, on a display of the first electronic device, detect a user input for selecting the at least one recommendation, determine by the first electronic device, control configuration information based on device properties of a second electronic device in a second IoT network, and send a message including the selected at least one recommendation to a second IoT network, wherein the message includes control configuration information for setting of a second electronic device in the second IoT network, wherein the control configuration information specifies an action to be performed at the second electronic device in response to the user input selecting the at least one recommendation; and wherein device properties of the second electronic device are different from device properties of the first electronic device.

7. The system as claimed in claim 6, wherein the at least one recommendation is transferrable to the other first electronic devices and at least one second electronic device in the second IoT network.

8. The system as claimed in claim 6, generate the at least one recommendation corresponding to the content, comprises:

extract actionable data items from the content displayed on the display;

determine at least one other electronic device in the first IoT network which is relevant to the actionable data items; and generate the at least one recommendation representing the content displayed on the first electronic device by fetching actions related to at least one other electronic device in the first IoT network based on a timestamp of a user activity and at least one electronic device on which the user activity is performed.

9. The system as claimed in claim 8, wherein the actionable data items are displayed on the first electronic device in one of a different color, an icon and a tagged user interface, and wherein the at least one recommendation indicates an information of at least one user activity performed on the at least one other electronic device in the first IoT network and a control configuration for at least one second electronic device in the second IoT network to perform the at least one user activity.

* * * * *